United States Patent
Zhang et al.

(10) Patent No.: US 12,418,375 B2
(45) Date of Patent: Sep. 16, 2025

(54) METHODS AND DEVICES FOR COMMUNICATING REFERENCE SIGNALS COMPRISING ALLOCATED PATTERNS

(71) Applicant: ZTE CORPORATION, Guangdong (CN)

(72) Inventors: Nan Zhang, Shenzhen (CN); Jianwu Dou, Shenzhen (CN); Wei Cao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 454 days.

(21) Appl. No.: 17/855,395

(22) Filed: Jun. 30, 2022

(65) Prior Publication Data

US 2022/0337372 A1    Oct. 20, 2022

Related U.S. Application Data

(63) Continuation of application No. PCT/CN2020/095832, filed on Jun. 12, 2020.

(51) Int. Cl.
H04L 5/00 (2006.01)

(52) U.S. Cl.
CPC .......... H04L 5/0051 (2013.01); H04L 5/0082 (2013.01)

(58) Field of Classification Search
CPC ... H04L 5/0051; H04L 5/0048; H04L 5/0082; H04L 5/0083; H04L 5/0078
See application file for complete search history.

(56) References Cited

U.S. PATENT DOCUMENTS

| | | | | |
|---|---|---|---|---|
| 2013/0294333 A1* | 11/2013 | Chen | .................. | H04L 27/2613 370/328 |
| 2015/0155993 A1* | 6/2015 | Berggren | .............. | H04L 5/0023 370/330 |
| 2019/0273544 A1* | 9/2019 | Cha | ........................ | H04L 5/0091 |

FOREIGN PATENT DOCUMENTS

| | | |
|---|---|---|
| CN | 104937873 A | 9/2015 |
| CN | 109428641 A | 3/2019 |
| CN | 110050431 A | 7/2019 |
| EP | 3 509 235 A2 | 7/2019 |
| WO | WO-2014/023361 A1 | 2/2014 |
| WO | WO-2018/227601 A1 | 12/2018 |
| WO | WO-2019/182401 A1 | 9/2019 |

OTHER PUBLICATIONS

Bupt et al., "DL Reference Signals for NR Positioning" 3GPP TSG RAN WG1 Meeting #98, R1-1910988, Oct. 14, 2019, Chongqing, China (10 pages).
International Search Report and Written Opinion for PCT Appl. No. PCT/CN2020/095832, mailed Mar. 3, 2021 (9 pages).
Extended European Search Report for EP Appl. No. 20940387.2, dated Nov. 25, 2022 (11 pages).
LG Electronics, "Un DM-RD pattern alternatives for DL timing case 3" 3GPP TSG RAN WG1 Meeting #61bis, R1-103739, Jul. 2, 2010, Dresden, Germany (4 pages).

(Continued)

*Primary Examiner* — Brian T Le
(74) *Attorney, Agent, or Firm* — Foley & Lardner LLP

(57) ABSTRACT

A wireless communication method for use in a transmitting node is disclosed. The wireless communication method comprises transmitting, to a receiving node, a reference signal comprising N patterns allocated to at least one scheduling unit, wherein N is an integer greater than 1.

12 Claims, 14 Drawing Sheets

(56) References Cited

OTHER PUBLICATIONS

Nokia et al., "Om Multiplexing of Different RS Types" 3GPP TSG-RAN WG1 #90bis, R1-1718514, Oct. 13, 2017, Prague, Czech Republic (5 pages).
First Office Action for CN Appl. No. 202080099908.6, dated Jul. 25, 2024 (with English translation, 23 pages).

* cited by examiner

Transmit, to the receiving node, the reference signal comprising N patterns allocated to scheduling unit(s) ⸺2100

FIG. 21

Receive, from the transmitting node, the reference signal comprising N patterns allocated to scheduling unit(s) ⸺2200

FIG. 22

Transmit, to the receiving node, data along with the reference signal comprising N patterns allocated to scheduling unit(s), wherein a transport block size of the data is determined based on the number of resource elements associated with the N patterns ⟶ 2300

FIG. 23

Receive, from the transmitting node, data along with the reference signal comprising N patterns allocated to scheduling unit(s), wherein a transport block size of the data is determined based on the number of resource elements associated with the N patterns ⟶ 2400

FIG. 24

METHODS AND DEVICES FOR COMMUNICATING REFERENCE SIGNALS COMPRISING ALLOCATED PATTERNS

CROSS-REFERENCE TO RELATED APPLICATION

This application claims the benefit of priority under 35 U.S.C. § 120 as a continuation of PCT Patent Application No. PCT/CN2020/095832, filed on Jun. 12, 2020, the disclosure of which is incorporated herein by reference in its entirety.

TECHNICAL FIELD

This document is generally directed to wireless communications.

SUMMARY

In existing systems, the design of reference signal (RS), e.g., the demodulation reference signal (DM-RS), mainly targets to transmission scenarios with different channel conditions, to ensure system efficiency. For example, the same pattern of the DM-RS is applied per scheduling unit (e.g. resource block RB and slot or sub-slot in existing specifications) within the resource occupied by the scheduled channel. In other words, with regarding to time domain behavior of the DM-RS, the same pattern of DM-RS is repeated across slots in case of aggregated transmission or repetition.

More, specifically, in 5G, many parameters (e.g. a DM-RS-type, the number of front-loaded DM-RSs, the number of additional DM-RSs) are used to define the repeated pattern and are configured by the higher layer signaling. Note that the supported number of DM-RS ports is also determined by code-division multiplexing (CDM) group by introducing either orthogonal cover code (OCC) in time/frequency or cyclic shift (CS) shift. The capacity for current DM-RS design supports 8 and 12 ports for DM-RS type 1 and 2, respectively. In other cases, the DM-RS location is fixed within the allocation region. For example, in long term evolution category M1 (LTE-M), the DM-RS is always transmitted in the resource with a symbol index equal to 3. In the narrowband internet of things (NB-IoT), the allocation time domain resource for the DM-RS of physical uplink shared channel (PUSCH) is coupled with the corresponding format of the PUSCH.

When analyzing the channel condition, the channel condition is characterized mainly by two aspects: frequency selectivity and time-variant behavior. The frequency selectivity is determined by the condition of multiple paths. When there are more multiple paths, more channels in frequency domain are available. The time variant behavior is determined jointly by the multiple paths and mobility. Note that frequency offset estimation becomes more difficult with an increasing number of multiple paths.

This document relates to methods, systems, and devices for configuring a reference signal, and in particular for configuring a reference signal allocated to at least one scheduling unit.

The present disclosure relates to a wireless communication method for use in a transmitting node. The wireless communication method comprises transmitting, to a receiving node, a reference signal comprising N patterns allocated to at least one scheduling unit, wherein N is an integer greater than 1.

Various embodiments may preferably implement the following features:

Preferably, the at least one scheduling unit refers to a resource comprising at least one of a set of resource blocks, a set of symbols, a set of slots, a set of repetition units, a repetition unit, a frame, or a slot.

Preferably, the at least one scheduling unit refers to a resource allocated via at least one scheduling signaling.

Preferably, the reference signal refers to at least one of a demodulation reference signal, a channel state information reference a signal, phase tracking reference signal, a positioning reference signal, or a sounding reference signal.

Preferably, the N patterns are different from each other.

Preferably, at least one parameter of at least one of a reference signal type, a front-loaded reference signal configuration, an additional reference signal configuration a time domain location of the reference signal or a frequency location of the reference signal are configured for each of the N patterns.

Preferably, at least one parameter of at least one of a reference signal type, a front-loaded reference signal configuration, an additional reference signal configuration, a time domain location of the reference signal or a frequency location of the reference signal for a first pattern of the N patterns is determined by at least one of:

corresponding parameters of a second pattern of the N patterns, index of resource comprising the reference signal associated with the first pattern and the second pattern, or scheduling information of data corresponding to the reference signal associated with the first pattern and the second pattern.

Preferably, a third pattern of the N patterns is determined by disabling the entire reference signal in a fourth pattern.

Preferably, a fifth pattern of the N patterns comprises a part of the reference signal in a sixth pattern of the N patterns.

Preferably, the reference signal in the fifth pattern is determined by disabling or selecting a fraction of the reference signal in the sixth pattern.

Preferably, the disabled or selected fraction of the reference signal in the sixth pattern is determined based on a factor.

Preferably, wherein the disabled or selected fraction of the reference signal in the sixth pattern is located at an upper or lower half of the second pattern.

Preferably, each of the at least one scheduling unit is corresponding to one of the N patterns based on a bit map.

Preferably, each of the at least one scheduling unit is corresponding to one of the N patterns based on a predetermined rule.

Preferably, scheduling units with an odd index are corresponding to the same pattern or scheduling units with an even index are corresponding to the same pattern.

Preferably, the scheduling units carrying the data with the same scheduling information are corresponding to the same pattern.

Preferably, the scheduling units carrying the data with scheduling information which belongs to the same group are corresponding to the same pattern.

Preferably, the at least one scheduling unit comprises a basic pattern group which is across L scheduling units and comprises the N patterns, wherein L is an integer greater than or equal to N Preferably, the basic pattern group is repeated on M scheduling units, wherein M is an integer greater than L.

Preferably, the first scheduling unit of the basic pattern group carries the reference signal.

Preferably, the first scheduling unit of the at least one scheduling unit carries the reference signal.

Preferably, an indication of enabling the reference signal is received from or transmitted to the receiving node by the transmitting node.

Preferably, a configuration associated with the reference signal is received from or transmitted to the receiving node by the transmitting node, wherein the configuration comprises at least one of a factor, a bit map, the number of scheduling units in single repetition unit, a front-loaded reference signal configuration for the N patterns, an additional reference signal configuration for the N pattern, a time domain location of the reference signal or a frequency location of the reference signal.

Preferably, scheduling information of data associated with the reference signal is received from or transmitted to the receiving node by the transmitting node, wherein the scheduling information comprises at least one of a redundancy version, a new data indicator, a modulation and coding scheme, a transmission configuration indication, a quasi co-location relationship, a resource allocation type or a channel format.

The present disclosure relates to a wireless communication method for use in a receiving node. The wireless communication method comprises receiving, from a transmitting node, reference signal comprising N patterns allocated to at least one scheduling unit, wherein N is an integer greater than 1.

Various embodiments may preferably implement the following features:

Preferably, the at least one scheduling unit refers to a resource comprising at least one of a set of resource blocks, a set of symbols, a set of slots, a set of repetition unit, a repetition unit, a frame, or a slot.

Preferably, the at least one scheduling unit refers to a resource allocated via at least one scheduling signaling.

Preferably, the reference signal refers to at least one of a demodulation reference signal, a channel state information reference signal, a phase tracking reference signal, a positioning reference signal, or a sounding reference signal.

Preferably, the N patterns are different from each other.

Preferably, at least one parameter of at least one of a reference signal type, a front-loaded reference signal configuration, an additional reference signal configuration, a time domain location of the reference signal or a frequency location of the reference signal are configured for each of the N patterns.

Preferably, at least one parameter of at least one of a reference signal type, a front-loaded reference signal configuration, an additional reference signal configuration, a time domain location of the reference signal or a frequency location of the reference signal for a first pattern of the N patterns is determined by at least one of:

corresponding parameters of a second pattern of the N patterns, index of resource comprising the reference signal associated with the first pattern and the second pattern, or scheduling information of data corresponding to the reference signal associated with the first pattern and the second pattern.

Preferably, a third pattern of the N patterns is determined by disabling the entire reference signal in a fourth pattern.

Preferably, a fifth pattern of the N patterns comprises a part of the reference signal in a sixth pattern of the N patterns.

Preferably, the reference signal in the fifth pattern is determined by disabling or selecting a fraction of the reference signal in the sixth pattern.

Preferably, the disabled or selected fraction of the reference signal in the sixth pattern is determined based on a factor.

Preferably, the disabled or selected fraction of the reference signal in the sixth pattern is located at an upper or lower half of the second pattern.

Preferably, each of the at least one scheduling unit is corresponding to one of the N patterns based on a bit map.

Preferably, each of the at least one scheduling unit is corresponding to one of the N patterns based on a predetermined rule.

Preferably, scheduling units with an odd index are corresponding to a same pattern or scheduling units with an even index are corresponding to a same pattern.

Preferably, the scheduling units carrying the data with the same scheduling information are corresponding to the same pattern.

Preferably, the scheduling units carrying the data with scheduling information which belongs to the same group are corresponding to the same pattern.

Preferably, the at least one scheduling unit comprises a basic pattern group which is across L scheduling units and comprises the N patterns, wherein L is an integer greater than or equal to N.

Preferably, the basic pattern group is repeated on M scheduling units, wherein M is an integer greater than L.

Preferably, the first scheduling unit of the basic pattern group carries the reference signal.

Preferably, the first scheduling unit of the at least one scheduling unit carries the reference signal.

Preferably, an indication of enabling the reference signal is transmitted to or received from the transmitting node by the receiving node.

Preferably, a configuration associated with the reference signal is transmitted to or received from the transmitting node by the receiving node, wherein the configuration comprises at least one of a factor, a bit map, the number of scheduling units in single repetition unit, a front-loaded reference signal configuration for the N patterns, an additional reference signal configuration for the N pattern, a time domain location of the reference signal or a frequency location of the reference signal.

Preferably, scheduling information of data associated with the reference signal is transmitted to or received from the transmitting node by the receiving node, wherein the scheduling information comprises at least one of a redundancy version, a new data indicator, modulation and coding scheme, a transmission configuration indication, a quasi co-location relationship, a resource allocation type or a channel format.

The present disclosure relates to a wireless communication method for use in a transmitting node. The wireless communication method comprises transmitting, to a receiving node, data along with a reference signal comprising N patterns allocated to at least one scheduling unit, wherein N is an integer greater than 1, wherein a transport block size of the data is determined based on the number of resource elements associated with the N patterns.

Various embodiments may preferably implement the following features:

Preferably, the number of resource elements associated with the N patterns is determined based on the number of resource elements carrying the reference signal in the pattern with the highest reference signal density among the N patterns.

Preferably, the number of resource elements associated with the N patterns is determined based on an average of the number of resource elements carrying the reference signal in each of N patterns.

Preferably, the number of resource elements associated with the N patterns is determined based on the number of resource elements carrying the reference signal in the pattern having the highest reference signal density among the N patterns and a ratio.

Preferably, the number of resource elements associated with the N patterns is determined based on the number of resource elements carrying the reference signal in the pattern having the lowest reference signal density among the N patterns.

Preferably, the N patterns form at least one basic pattern group across L scheduling units, wherein L is an integer greater than or equal to N, wherein the basic pattern group is repeated on M scheduling units, wherein M is an integer greater than L, wherein the transport block size is determined per basic pattern group or for all of M scheduling units.

Preferably, the transport block size is determined for all of M scheduling units and a modulation and coding scheme is configured for the M scheduling units.

Preferably, the transport block size is determined per basic pattern group and a modulation and coding schemes is configured per basic pattern group.

Preferably, the at least one scheduling unit refers to a resource comprising at least one of a set of resource blocks, a set of symbols, a set of slots, a set of repetition units, a repetition unit, a frame, or a slot.

Preferably, wherein the reference signal refers to at least one of a demodulation reference signal, a channel state information reference signal, a phase tracking reference signal, a positioning reference signal, or a sounding reference signal.

The present disclosure relates to a wireless communication method for use in a receiving node. The wireless communication method comprises receiving, from a transmitting node, data along with a reference signal comprising N patterns allocated to at least one scheduling unit, wherein N is an integer greater than 1, wherein a transport block size of the data is determined based on the number of resource elements associated with the N patterns.

Various embodiments may preferably implement the following features:

Preferably, the number of resource elements associated with the N patterns is determined based on the number of resource elements carrying the reference signal in the pattern with the highest reference signal density among the N patterns.

Preferably, the number of resource elements associated with the N patterns is determined based on an average of the number of resource elements carrying the reference signal in each of N patterns.

Preferably, the number of resource elements associated with the N patterns is determined based on the number of resource elements carrying the reference signal in the pattern having the highest reference signal density among the N patterns and a ratio.

Preferably, the number of resource elements associated with the N patterns is determined based on the number of resource elements carrying the reference signal in the pattern having the lowest reference signal density among the N patterns.

Preferably, the N patterns form at least one basic pattern group across L scheduling units, wherein L is an integer greater than or equal to N, wherein the basic pattern group is repeated on M scheduling units, wherein M is an integer greater than L, wherein the transport block size is determined per basic pattern group or for all of M scheduling units.

Preferably, the transport block size is determined for all of M scheduling units and a modulation and coding scheme is configured for the M scheduling units.

Preferably, the transport block size is determined per basic pattern group and a modulation and coding schemes is configured per basic pattern group.

Preferably, the at least one scheduling unit refers to a resource comprising at least one of a set of resource blocks, a set of symbols, a set of slots, a set of repetition units, a repetition unit, a frame, or a slot.

Preferably, wherein the reference signal refers to at least one of a demodulation reference signal, a channel state information reference signal, a phase tracking reference signal, a positioning reference signal, or a sounding reference signal.

The present disclosure relates to a transmitting node. The transmitting node comprises a communication unit, configured to transmit, to a receiving node, a reference signal comprising N patterns allocated to at least one scheduling unit, wherein N is an integer greater than 1.

Various embodiments may preferably implement the following feature:

Preferably, the transmitting node further comprises a processor configured to perform a wireless communication method of any of the foregoing described methods.

The present disclosure relates to a receiving node. The receiving node comprises a communication unit, configured to receive, from a transmitting node, a reference signal comprising N patterns allocated to at least one scheduling unit, wherein N is an integer greater than 1.

Various embodiments may preferably implement the following feature:

Preferably, the receiving node further comprises a processor configured to perform a wireless communication method of any of the foregoing described methods.

The present disclosure relates to a transmitting node. The transmitting node comprises a communication unit, configured to transmit, to a receiving node, data along with a reference signal comprising N patterns allocated to at least one scheduling unit, wherein N is an integer greater than 1, wherein a transport block size of the data is determined based on the number of resource elements associated with the N patterns.

Various embodiments may preferably implement the following feature:

Preferably, the transmitting node further comprises a processor configured to perform a wireless communication method of any of the foregoing described methods.

The present disclosure relates to a receiving node. The receiving node comprises a communication unit, configured to receive, from a transmitting node, data along with a reference signal comprising N patterns allocated to at least one scheduling unit, wherein N is an integer greater than 1, wherein a transport block size of the data is determined based on the number of resource elements associated with the N patterns.

Various embodiments may preferably implement the following feature:

Preferably, the receiving node further comprises a processor configured to perform a wireless communication method of any of the foregoing described methods.

The present disclosure relates to a computer program product comprising a computer-readable program medium code stored thereupon, the code, when executed by a processor, causing the processor to implement a wireless communication method of any of the foregoing described methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF THE DRAWINGS

The above and other aspects and their implementations are described in greater detail in the drawings, the descriptions, and the claims.

FIG. 21 shows a flowchart of a process according to an embodiment of the present disclosure.

FIG. 22 shows a flowchart of a process according to an embodiment of the present disclosure.

FIG. 23 shows a flowchart of a process according to an embodiment of the present disclosure.

FIG. 24 shows a flowchart of a process according to an embodiment of the present disclosure.

DETAILED DESCRIPTION

Figure 1:
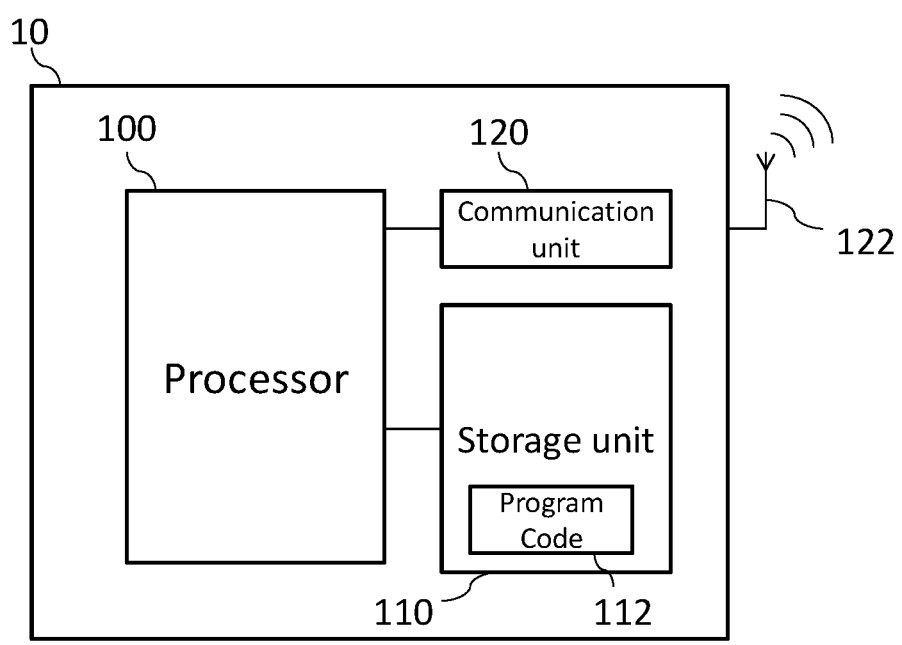
FIG. 1 shows an example of a schematic diagram of a wireless terminal according to an embodiment of the present disclosure.

FIG. 1 relates to a schematic diagram of a wireless terminal 10 according to an embodiment of the present disclosure. The wireless terminal 10 may be a user equipment (UE), a mobile phone, a laptop, a tablet computer, an electronic book or a portable computer system and is not limited thereto. The wireless terminal 10 may include a processor 100 such as a microprocessor or Application Specific Integrated Circuit (ASIC), a storage unit 110 and a communication unit 120. The storage unit 110 may be any data storage device that stores a program code 112, which is accessed and executed by the processor 100. Embodiments of the storage unit 112 include but are not limited to a subscriber identity module (SIM), read-only memory (ROM), flash memory, random-access memory (RAM), hard-disk, and optical data storage device. The communication unit 120 may a transceiver and is used to transmit and receive signals (e.g. messages or packets) according to processing results of the processor 100. In an embodiment, the communication unit 120 transmits and receives the signals via at least one antenna 122 shown in FIG. 1.

In an embodiment, the storage unit 110 and the program code 112 may be omitted and the processor 100 may include a storage unit with stored program code.

The processor 100 may implement any one of the steps in exemplified embodiments on the wireless terminal 10, e.g., by executing the program code 112.

The communication unit 120 may be a transceiver. The communication unit 120 may as an alternative or in addition be combining a transmitting unit and a receiving unit configured to transmit and to receive, respectively, signals to and from a wireless network node (e.g. a base station).

Figure 2:
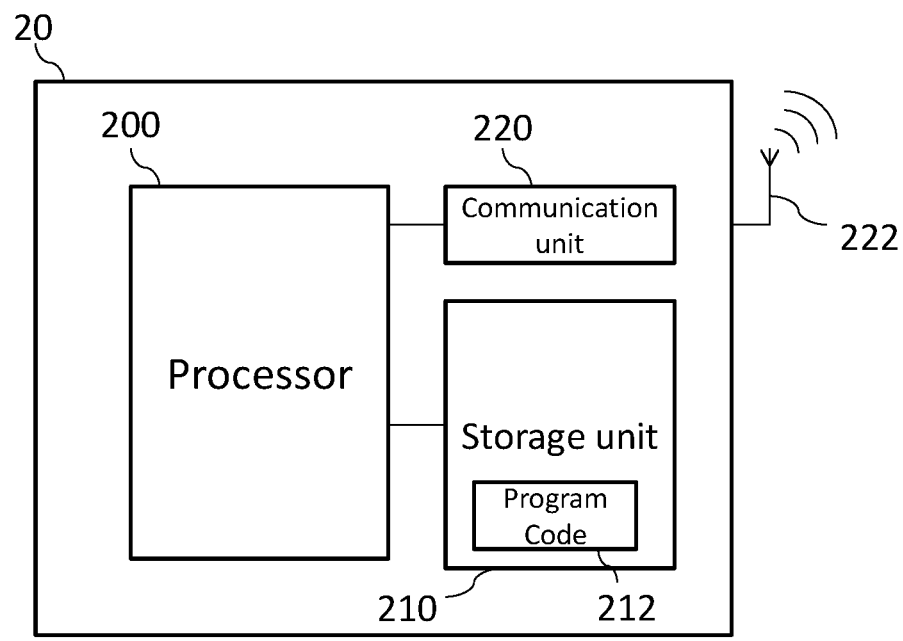
FIG. 2 shows an example of a schematic diagram of a wireless network node according to an embodiment of the present disclosure.

FIG. 2 relates to a schematic diagram of a wireless network node 20 according to an embodiment of the present disclosure. The wireless network node 20 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited thereto. In addition, the wireless network node 20 may comprise (perform) at least one network function such as an access and mobility management function (AMF), a session management function (SMF), a user place function (UPF), a policy control function (PCF), an application function (AF), etc. The wireless network node 20 may include a processor 200 such as a microprocessor or ASIC, a storage unit 210 and a communication unit 220. The storage unit 210 may be any data storage device that stores a program code 212, which is accessed and executed by the processor 200. Examples of the storage unit 212 include but are not limited to a SIM, ROM, flash memory, RAM, hard-disk, and optical data storage device. The communication unit 220 may be a transceiver and is used to transmit and receive signals (e.g. messages or packets) according to processing results of the processor 200. In an example, the communication unit 220 transmits and receives the signals via at least one antenna 222 shown in FIG. 2.

In an embodiment, the storage unit 210 and the program code 212 may be omitted. The processor 200 may include a storage unit with stored program code.

The processor 200 may implement any steps described in exemplified embodiments on the wireless network node 20, e.g., via executing the program code 212.

The communication unit 220 may be a transceiver. The communication unit 220 may as an alternative or in addition be combining a transmitting unit and a receiving unit configured to transmit and to receive, respectively, signals to and from a wireless terminal (e.g. UE).

In the present disclosure, a reference signal (RS) may be any signal utilized for estimating (e.g. determining, detecting or measuring) channel conditions such as a demodulation reference signal (DM-RS), a phase tracking reference signal (PTRS), a positioning reference signal (PRS), a sounding reference signal (SRS), a channel state information reference signal (CSI-RS), etc. The following embodiments are exemplified with the DM-RS for brevity.

In the present disclosure, the DM-RS may be utilized for a physical downlink shared channel (PDSCH), a physical uplink shared channel (PUSCH), a physical downlink control channel (PDCCH) and/or a sidelink channel. In other words, the DM-RS may be transmitted from a UE to a BS, from a BS to a UE or from a UE to another UE.

In an embodiment, the RS may be allocated to scheduling unit(s), wherein the scheduling unit(s) comprise(s) at least one of a set of resource blocks, a set of symbols, a repetition unit, a set of repetition units, a slot, a set of slots or a frame.

In the present disclosure, a resource block (RB) may be a physical resource block (PRB) and vice versa.

In an embodiment, the RS overhead may need to be reduced for improving spectrum efficiency. For example, the RS overhead reduction may be considered in case of a non-terrestrial network (NTN) with the implementation of an directional antenna and/or pre-/post compensation of the frequency offset and/or the implementation of lower mobility (e.g. geostationary earth orbit (GEO)) or terrestrial network (TN) with lower UE mobility and/or lower scheduling modulation coding scheme (MCS) (e.g., for a cell edge UE or a region with requirements on coverage extension or machine type communication (MTC) type UE).

More details of the RS overhead reduction are discussed in the following embodiments. Note that skilled person in the art should acknowledge that the following embodiments may be implemented individually or in any possible combination.

Embodiment 1

In an embodiment, the RS overhead reduction may be implemented in frequency domain. For example, the RS overhead reduction may be applied in different frequency resource levels (e.g. different granularities).

In an embodiment, the RS overhead reduction is applied to the resource element (RE) level. That is, the RS overhead reduction is implemented in a certain granularity of the RE. In this embodiment, the reference signal carried by certain RE(s) in each RB (e.g. PRB) may be disabled.

Figure 3:
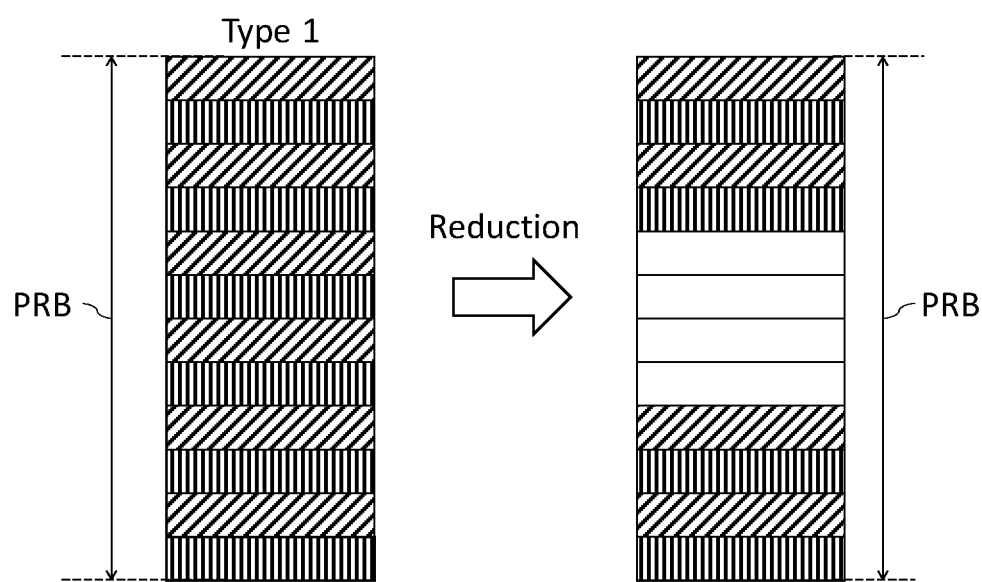
FIG. 3 shows a reference signal pattern according to an embodiment of the present disclosure.
Figure 4:
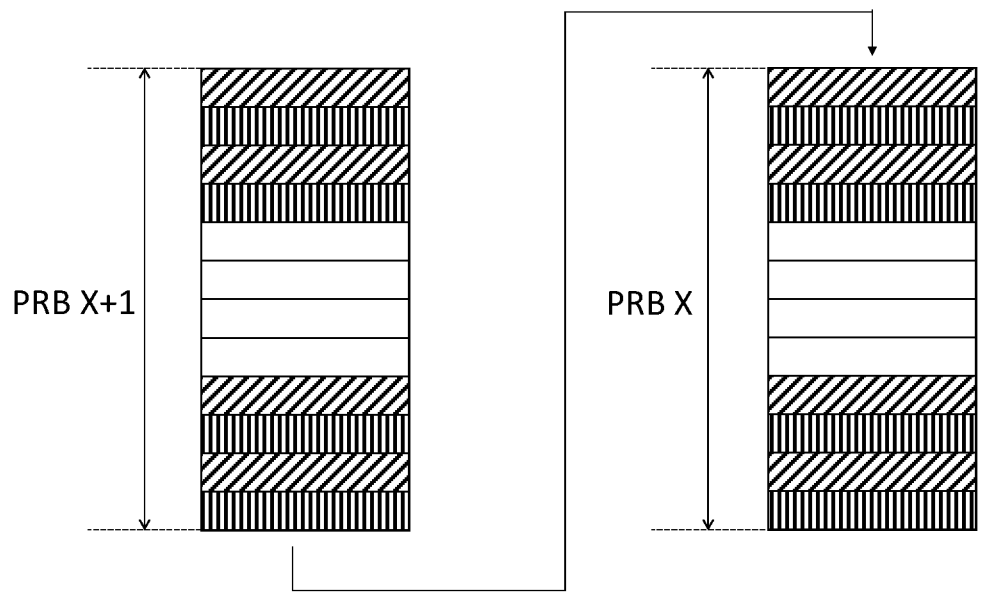
FIG. 4 shows a schematic diagram of a reference signal across physical resource blocks according to an embodiment of the present disclosure.

FIG. 3 shows a schematic diagram of a reduced DM-RS pattern according to an embodiment of the present disclosure. In FIG. 3, the type 1 DM-RS pattern within a PRB is shown at the left side, wherein blocks with different textures are REs with the DM-RS corresponding to different DM-RS ports and the REs with the same texture carry the DM-RS for the same DM-RS port. In this embodiment, the DM-RS on 4 REs in the middle of the type 1 DM-RS pattern within the PRB is disabled, to reduce the RS overhead. In other words, the reduced DM-RS pattern comprises a part (e.g. a fraction or a subset) of the reference signal in the type 1 DM-RS pattern within the single PRB. In an embodiment, the part (e.g. fraction) of the reference signal which is in the original type 1 DM-RS and comprised by the reduced DM-RS pattern is determined by disabling a fraction of reference signal of the type 1 DM-RS (e.g. disabling the reference signal on the 4 middle REs within the single PRB) or selecting a fraction of the reference signal of the type 1 DM-RS (e.g. selecting the reference signal on the top 4 REs and the bottom 4 REs of the type 1 DM-RS within the single PRB). In an embodiment, the disabled or selected reference signal is determined based on a down sample factor, e.g., with a value of $2/3$. For example, the number of REs disabled on carrying the DM-RS and/or the number of REs selected to carry the DM-RS may be determined based on the down sample factor. In this embodiment, the reference signal on the 4 middle REs out of 12 REs ($4=12\times(1-2/3)$) within the single PRB may be disabled or the reference signal on the top 4 REs and the bottom 4 REs out of 12 REs (($4+4)=12\times 2/3$) within the single PRB may be selected when the down sample factor is configured with the value of $2/3$. In an embodiment, the reduced DM-RS pattern shown in FIG. 3 may be repeated in adjacent PRBs as shown in FIG. 4 (i.e. PRB X and PRB X+1).

Figure 5:
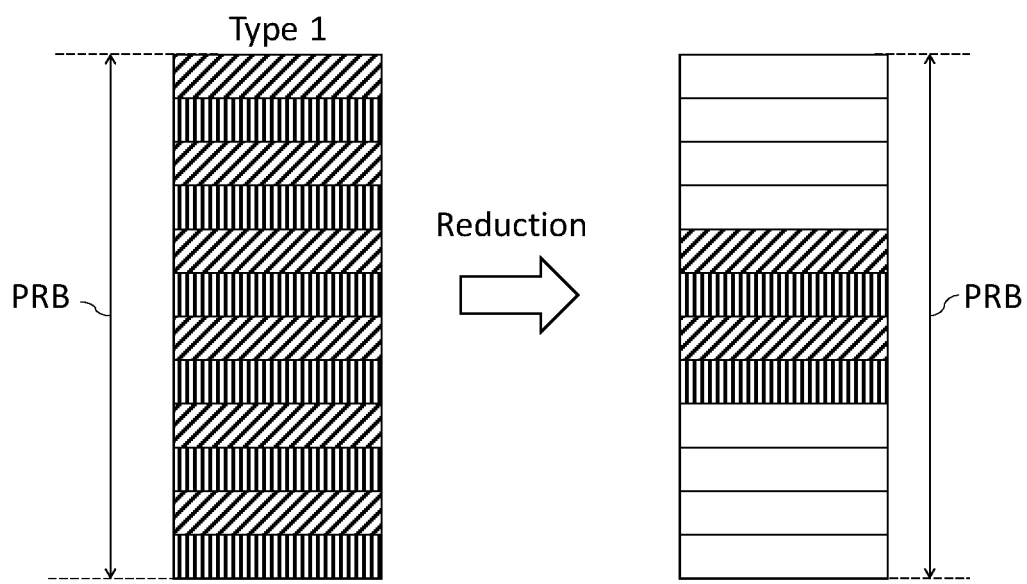
FIG. 5 shows a reference signal pattern according to an embodiment of the present disclosure.
Figure 6:
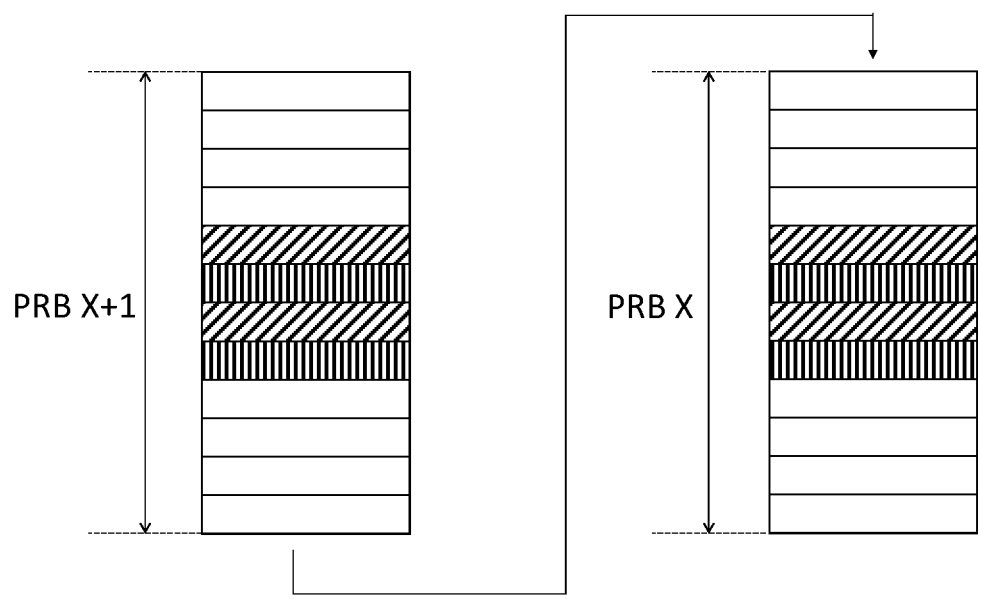
FIG. 6 shows a schematic diagram of a reference signal across physical resource blocks according to an embodiment of the present disclosure.

FIG. 5 shows a schematic diagram of a reduced DM-RS pattern according to an embodiment of the present disclosure, wherein blocks with different textures are REs with the DM-RS corresponding to different DM-RS ports and the REs with the same texture carry the DM-RS for the same DM-RS port. In FIG. 5, the RS overhead reduction is achieved by disabling the DM-RS on 4 REs at the top side and 4 REs at the bottom side of the PRB carrying on the type 1 DM-RS pattern. As an alternative, the reduced DM-RS pattern shown in FIG. 5 may be acquired (e.g. determined) by selecting the DM-RS on the middle 4 REs of the type 1 DM-RS pattern within the PRB. In an embodiment, the reduced DM-RS pattern shown in FIG. 5 is corresponding to a down sample factor with a value of ⅓. In an embodiment, the reduced DM-RS pattern shown in FIG. 5 may be repeated in adjacent PRBs as shown in FIG. 6 (i.e. PRB X and PRB X+1).

Figure 7:
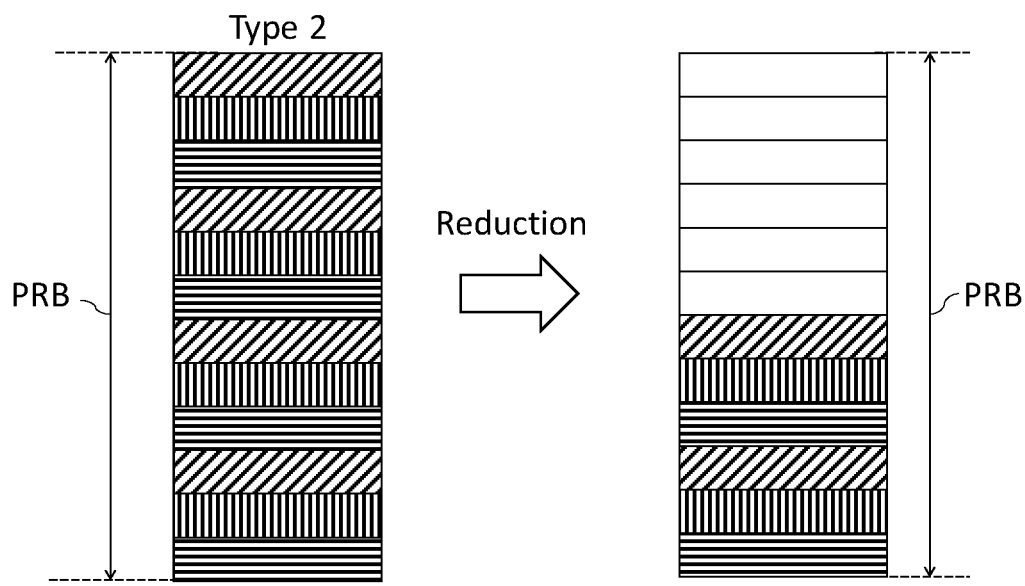
FIG. 7 shows a schematic diagram of a reference signal pattern according to an embodiment of the present disclosure.

FIG. 7 shows a schematic diagram of a reduced DM-RS pattern according to an embodiment of the present disclosure. In FIG. 7, the type 2 DM-RS pattern within a PRB is shown at left side, wherein blocks with different textures are REs with the DM-RS corresponding to different DM-RS ports and the REs with the same texture carry the DM-RS for the same DM-RS port. In this embodiment, the DM-RS carried by 6 REs on the upper half of the PRB are disabled for forming the reduced DM-RS pattern. In other words, the reference signal carried by 6 REs on the lower half of the PRB are selected for forming the reduced DM-RS pattern. In an embodiment, the reduced DM-RS pattern shown in FIG. 7 is corresponding to a down sample factor with a value of ½.

In an embodiment, the reference signal carried by 6 REs on the lower half of the PRB are disabled for forming another reduced DM-RS pattern. As an alternative, the reference signal carried by 6 REs on the upper half of the PRB are selected for forming the reduced DM-RS pattern.

Figure 8:
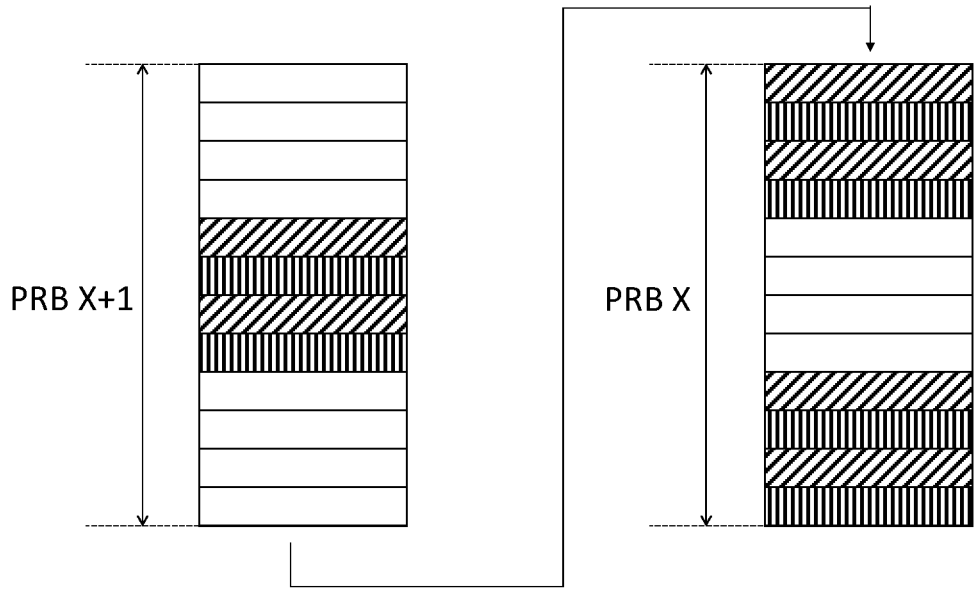
FIG. 8 shows a schematic diagram of a reference signal across physical resource blocks according to an embodiment of the present disclosure.

In an embodiment, the RS overhead reduction may be implemented on the REs across multiple PRBs (e.g. allocated resource or allocated bandwidth) as a whole. In such condition, the number of REs carrying the RS and/or the RS pattern in each of PRBs may be different. FIG. 8 shows a schematic diagram of the DM-RS across PRBs according to an embodiment of the present disclosure, wherein blocks with different textures are REs with the DM-RS corresponding to different DM-RS ports and the REs with the same texture carry the DM-RS for the same DM-RS port. In FIG. 8, because the RS overhead reduction is conducted on the REs of PRB X and PRB X+1 as a whole, the RS pattern corresponding to the PRB X+1 is different from that corresponding to the PRB X, e.g., to balance the RS density over entire allocated resource. As shown in FIG. 8, the DM-RS pattern corresponding to the PRB X+1 is that shown in FIG. 5 and the DM-RS pattern corresponding to the PRB X is that shown in FIG. 3.

In an embodiment, the RS overhead reduction is applied to an RB level. That is, the RS overhead reduction is implemented in a granularity of the RB. The reference signal on certain RBs may be disabled for achieving the RS overhead reduction.

Figure 9:
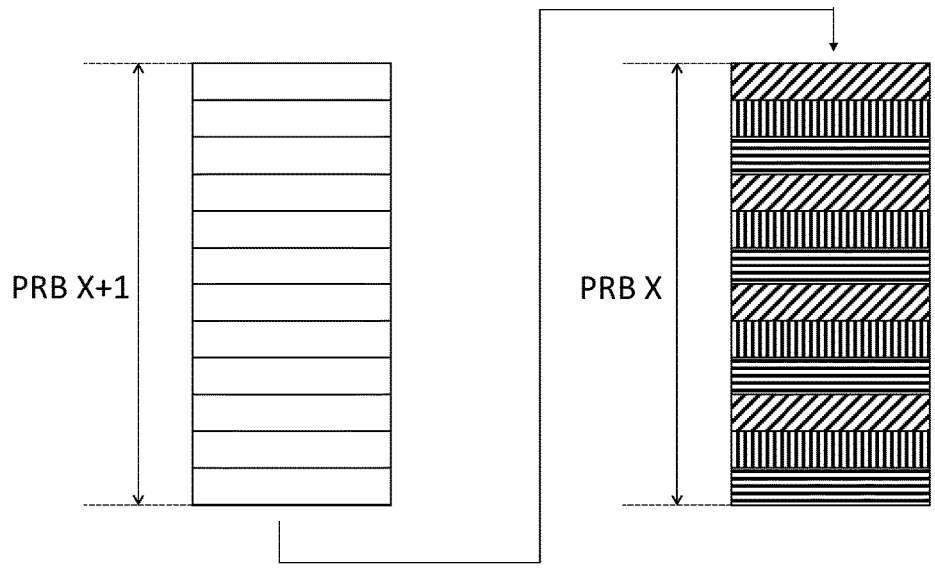
FIG. 9 shows a schematic diagram of a reference signal pattern across physical resource blocks according to an embodiment of the present disclosure.

FIG. 9 shows a schematic diagram of a reduced DM-RS pattern according to an embodiment of the present disclosure. In FIG. 9, the PRB X+1 and PRB X are allocated for the reduced DM-RS pattern. In this embodiment, the DM-RS on the PRB X+1 is disabled (or the reference signal in the PRB X is selected). Note that the orthogonality is kept at least within one PRB in the reduced DM-RS pattern shown in FIG. 9.

In an embodiment, the reduced DM-RS pattern build on the RB level may be indicated by a bitmap. For example, a length of the bitmap may be equal to the number of scheduling units (e.g. allocated resources) in the reduced DM-RS pattern. In addition, the bit "0" refers to disabling for carrying the DM-RS and the bit "1" refers enabling for carrying the DM-RS. Taking the reduced DM-RS pattern shown in FIG. 9 as an example, the number of PRBs (i.e. scheduling units) is 2, the reference signal in the PRB X+1 is disabled and the reference signal in the PRB X is selected. In such condition, the corresponding bitmap length is 2, the bit corresponding to the PRB X+1 is "0" and the bit corresponding to the PRB X is "1". For example, the bitmap corresponding to the reduced DM-RS pattern shown in FIG. 9 may be [0 1].

In an embodiment, the reduced DM-RS pattern build on the RB level may have an equaled/unequaled RS density.

In an embodiment, up to M PRBs are scheduled (e.g. allocated), wherein M is an integer greater than 1. In this embodiment, the scheduled PRBs comprise a basic DM-RS pattern group with L PRBs consisting of N DM-RS patterns (N is an integer greater than 1 and L is an integer greater than or equal to N and is smaller than or equal to M). The basic DM-RS pattern group may repeat within the scheduled M PRBs.

In an embodiment, the RS overhead reduction may be achieved by adopting frequency hopping. For example, a pattern of the frequency hopping may be determined by considering patterns of configuration of both front loaded and additional DM-RSs in either single slot level or multiple-slots level. In an embodiment of the frequency hopping within single slot, the frequency hopping of the DM-RS may be conducted between the front-loaded DM-RS and additional DM-RS.

Embodiment 2

In an embodiment, the RS overhead reduction may be implemented in time domain. For example, the RS overhead reduction may be implemented in a slot level. Within each slot, flexible RS configuration in time domain can be supported by configuring at least one of a RS type, a front-loaded RS configuration and an additional RS configuration.

Figure 10:
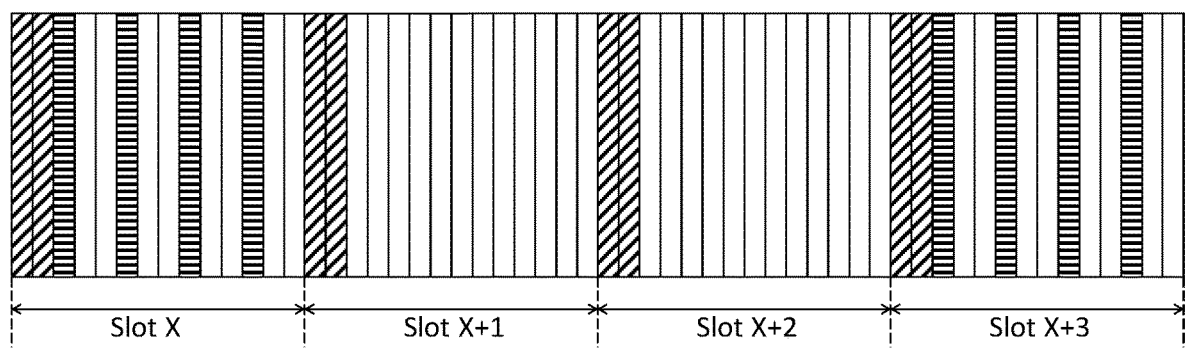
FIG. 10 shows a schematic diagram of a reference signal across slots according to an embodiment of the present disclosure.

In an embodiment, direct indication of enabling/disabling RS transmission across K slots (e.g. scheduling units) is configured, e.g., via a bitmap, wherein K is an integer greater than 1. FIG. 10 shows a schematic diagram of the DM-RS across slots according to an embodiment of the present disclosure. In FIG. 10, slots X, X+1, X+2 and X+3 are shown and each block in the slots X, X+1, X+2 and X+3 refers to an orthogonal frequency-division multiplexing (OFDM) symbol. In each slot, the first 2 symbols are configured for physical downlink control channel (PDCCH) and the symbols with horizontal line are allocated with DM-RS transmission. In this embodiment, an aggregation factor of the DM-RS pattern is 4 (i.e. the number of slots is 4). Thus, a size (length) of the corresponding bitmap indicating enabled/disabled of the DM-RS is 4, to indicate whether the DM-RS (transmission) is enabled/disabled in each slot. As shown in FIG. 10, the DM-RS is enabled in slots X and X+3 and is disabled in slots X+1 and X+2. In such condition, the corresponding bitmap may be [1 0 0 1], wherein "1" indicates the DM-RS is enabled in corresponding slot and "0" indicates the DM-RS is disabled in the corresponding slot.

Figure 11:
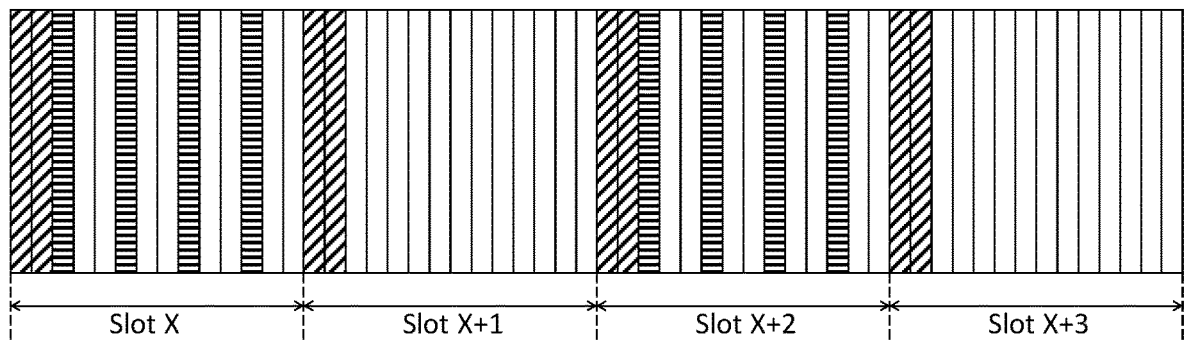
FIG. 11 shows a schematic diagram of a reference signal across slots according to an embodiment of the present disclosure.

In an embodiment, a fixed pattern (e.g. predefined rule) of enabling/disabling RS transmission across L slots is configured, where L is an integer greater than 1. For example, when the function of RS reduction is enabled, the DM-RS in the slots with odd/even index may be enabled/disabled. FIG. 11 shows a schematic diagram of the DM-RS across slots according to an embodiment of the present disclosure. In FIG. 11, the DM-RS is enabled in slots X and X+2 and is disabled in slots X+1 and X+3. In an embodiment, X is an odd integer in FIG. 11. That is, the DM-RS on the slots with even indexes is disabled and/or the DM-RS on the slots with odd indexes is enabled in FIG. 11. In an embodiment, X is an even integer in FIG. 11. In this embodiment, the DM-RS on the slots with odd indexes is disabled and/or the DM-RS on the slots with even indexes is enabled.

In an embodiment, the fixed pattern (predefined rule) may be determined based on a down sample factor I, wherein I is within a region [0 J] and J is the repetition or aggregation factor. For example, the DM-RS pattern shown in FIG. 11 may be determined based on the down sample factor with a value of 2 (i.e. I=2). That is, staring from the first slot, the DM-RS is disabled in even slots within the DM-RS pattern.

Figure 12:
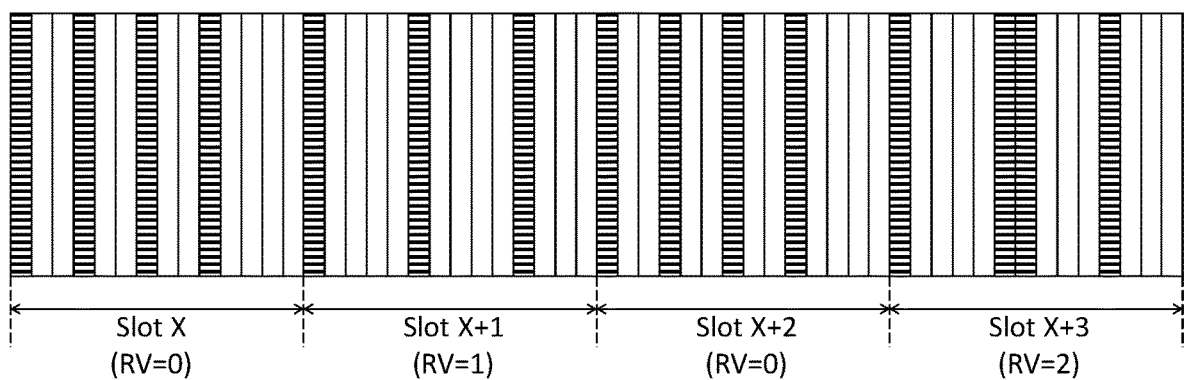
FIG. 12 shows a schematic diagram of a reference signal across slots according to an embodiment of the present disclosure.

In an embodiment, the RS pattern may be associated with (e.g. determined based on) scheduling information (e.g. redundant version (RV)) allocated for each transmission within corresponding slot(s). FIG. 12 shows a schematic diagram of the DM-RS across slots according to an embodiment of the present disclosure, wherein each block represents a symbol and the blocks with the texture of horizontal lines are symbols carrying the DM-RS. In this embodiment, the DM-RS pattern corresponding to each slot is determined based on the RV of each slot. For example, the DM-RS pattern with high density is used for the transmission allocated with RV of the value of 0 and the DM-RS pattern with low density is considered for transmission allocated with the RV of other values. In FIG. 12, the slots X and X+2 are located with RV of the value of 0, the slot X+1 is allocated with the RV of the value of 1 and the slot X+3 is allocated with the RV with the value of 2. Thus, the DM-RS pattern with high density (i.e. the DM-RS pattern with 3 additional DM-RS) is used in the slots X and X+2 and the DM-RS pattern with low density (i.e. the DM-RS pattern with 2 additional DM-RS) is used in the slots X+1 and X+3.

Figure 13:
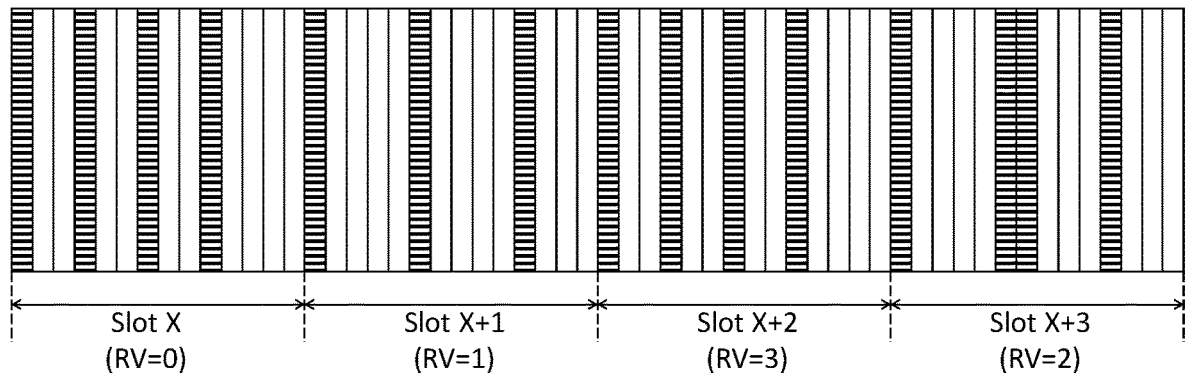
FIG. 13 shows a schematic diagram of a reference signal across slots according to an embodiment of the present disclosure.

In an embodiment, the RV with certain pre-selected values may be configured with the DM-RS pattern with high/low density. For example, the RV values may be divided into multiple groups and different groups are corresponding to different DM-RS patterns. FIG. 13 shows a schematic diagram of the DM-RS across slots according to an embodiment of the present disclosure, wherein each block represents a symbol and the blocks with the texture of horizontal lines are symbols carrying the DM-RS. In this embodiment, the transmission configured with the RV of the value of 0 or 3 is configured with the DM-RS pattern of high density and the transmission allocated with RV of other values is configured with different patterns. That is, the RV of the values of 0 and 3 are in a group and the RV of the values of 1 and 2 are in another group. In FIG. 13, the slot X is located with the RV of the value of 0, the slot X+1 is allocated with the RV of the value of 1, the slot X+2 is allocated with the RV of the value of 3 and the slot X+3 is allocated with the RV with the value of 2. In such condition, the DM-RS pattern with high density (i.e. the DM-RS pattern with 3 additional DM-RS) is used in the slots X and X+2 and the DM-RS pattern with low density (i.e. the DM-RS pattern with 2 additional DM-RS) is utilized in the slots X+1 and X+3.

In an embodiment, for the transmission allocated with RV of values other than those corresponding to the DM-RS pattern of high density (e.g. the RV of values other than 0 and 3), the DM-RS pattern can be either the same or different.

Figure 14:
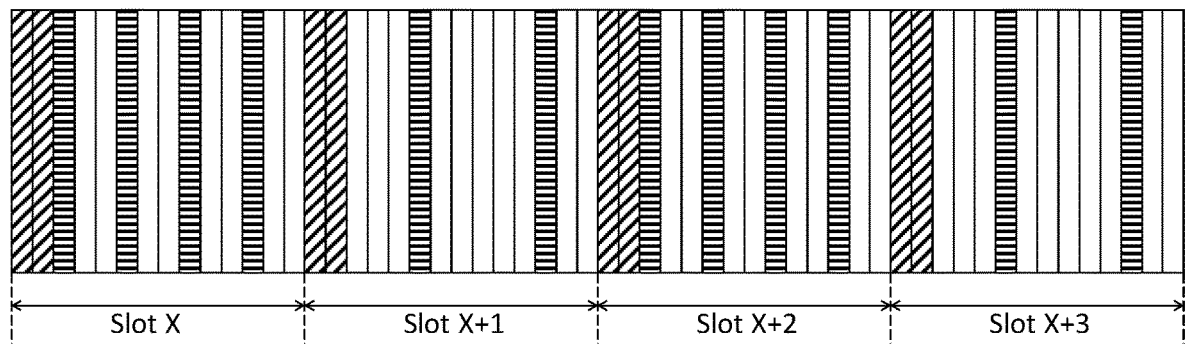
FIG. 14 shows a schematic diagram of a reference signal across slots according to an embodiment of the present disclosure.

In an embodiment, the same RS pattern is used for each scheduling unit (e.g. slot) and a fraction (e.g. a part or a subset) of the reference signal in certain scheduling unit(s) may be disabled for reducing the RS overhead. For example, certain slots with disabled RS may be selected based on the predefined rules (e.g. the slots with odd/even index). FIG. 14 shows a schematic diagram of the DM-RS across slots according to an embodiment of the present disclosure, wherein each block refers to a symbol within the slot, the first 2 blocks of each slot are configured for the PDCCH and the block with the texture of horizontal lines refers to symbols carrying the DM-RS. In FIG. 14, the same DM-RS configuration are used for slots X, X+1, X+2 and X+3 and the slots X+1 and X+3 are selected, e.g., for reducing the RS overhead. In this embodiment, the first DM-RS and the third DM-RS of the DM-RS pattern are disabled in the selected slots X+1 and X+3.

In an embodiment, the RS overhead reduction may be achieved by applying the same RS pattern to all the scheduling units (e.g. slots) and by disabling the entire or a part (a fraction or a subset) of the reference signal in certain scheduling units (e.g. those selected based on the predefined rules), e.g., as shown in FIGS. 10 to 14.

Figure 15:
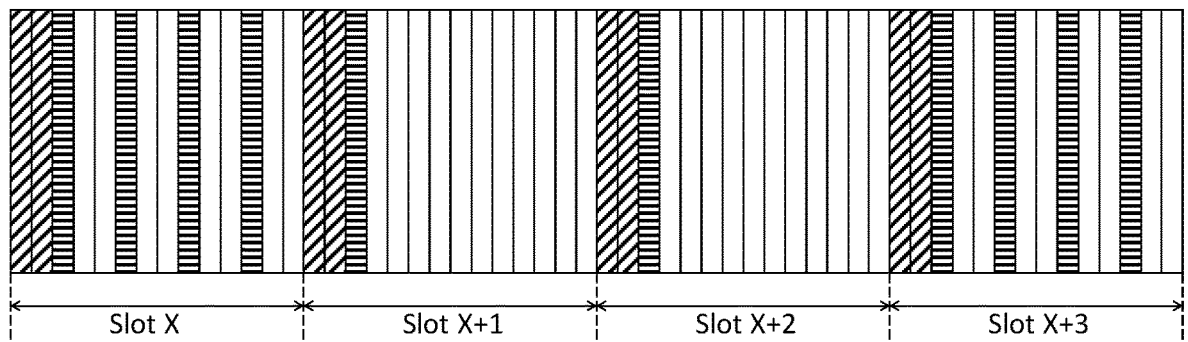
FIG. 15 shows a schematic diagram of a reference signal across slots according to an embodiment of the present disclosure.

In an embodiment, the RS overhead reduction may be achieved by applying multiple RS patterns for the scheduling units and at least one of the applied patterns has lower density (e.g. in time domain and/or in frequency domain). FIG. 15 shows a schematic diagram of the DM-RS across slots according to an embodiment of the present disclosure. In FIG. 15, the slots X and X+3 are configured with the DM-RS pattern of additional DM-RS=3 and the slots X+1 and X+2 are configured with the DM-RS pattern without additional DM-RS. Note that the slots selected for the DM-RS pattern with high density (e.g. DM-RS pattern enabling 3 additional DM-RSs) or low density (DM-RS pattern without additional DM-RS) may be determined based on a bitmap, predefined rule(s) and/or a down sample factor.

Figure 16:
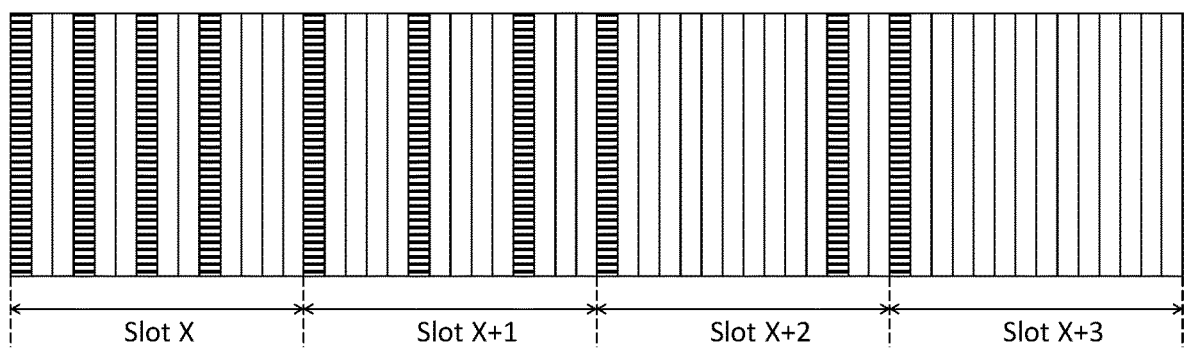
FIG. 16 shows a schematic diagram of a reference signal across slots according to an embodiment of the present disclosure.

In an embodiment, different DM-RS patterns are configured for each scheduling unit. Note that differences between the DM-RS patterns for the scheduling units may be indicated via corresponding parameters of configuring the DM-RS. FIG. 16 shows a schematic diagram of the reference signal across slots according to an embodiment of the present disclosure. In FIG. 16, the slot X is configured with a DMRS configuration enabling additional DM-RS=3, the slot X+1 is configured with a DMRS configuration enabling additional DM-RS=2, the slot X+2 is configured with a DMRS configuration enabling additional DM-RS=1, and the slot X+3 is configured with a DMRS configuration enabling additional DM-RS=0 (i.e. no additional DM-RS). Note that differences between the DM-RS patterns for slots may be indicated via corresponding parameters for the DM-RS configuration. In this embodiment, the DM-RS patterns configured for the slots X, X+1, X+2 and X+3 are different at the additional DM-RS configuration. Thus, the corresponding parameters additional Pos of configuring the DM-RS may be indicated.

In an embodiment, the reference signal shown in FIG. 10 to 16 may be regarded as basic pattern groups, e.g., for use with a transmission with large repetition number or aggregation factor. More specifically, in an embodiment of a transmission with a repetition unit of M slots, the basic pattern-group may comprise L slots (L≤M) and the basic pattern-group is repeated to cover all N slots in the repetition unit.

Figure 17A:
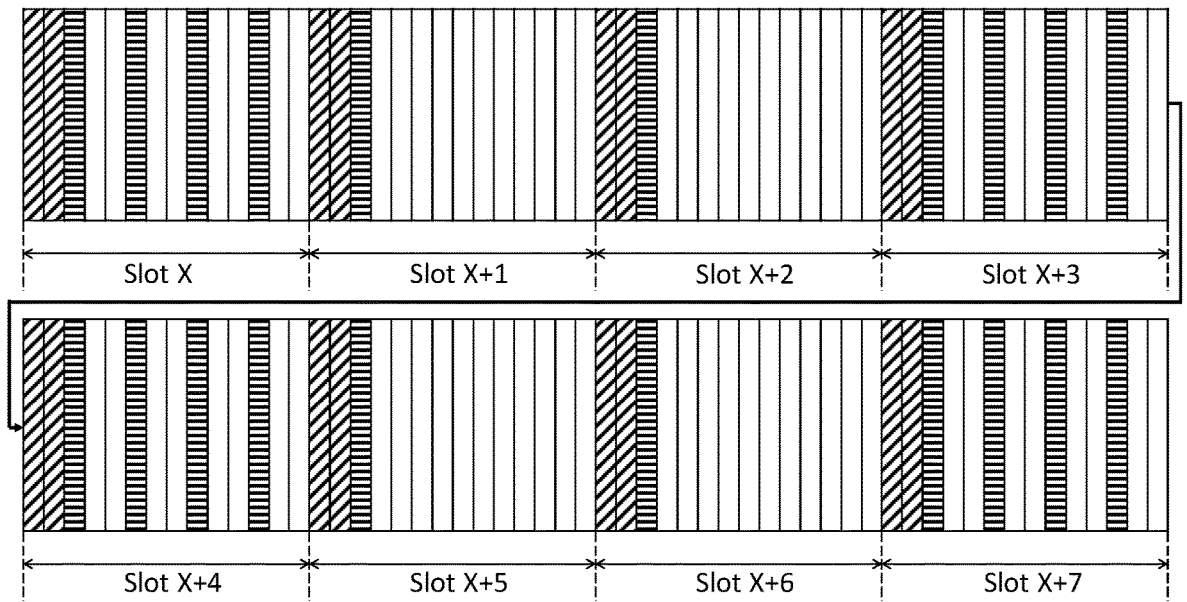
FIGS. 17A and 17B show a schematic diagram of a reference signal across slots according to an embodiment of the present disclosure.
Figure 17B:
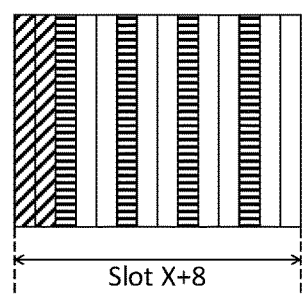

FIGS. 17A and 17B show a schematic diagram of the DM-RS across slots according to an embodiment of the present disclosure. In FIGS. 17A and 17B, a repetition unit comprises 9 slots X to X+8 and the basic pattern group is similar to the reference signal shown in FIG. 15. In such condition, the basic pattern group is repeated in slots X to X+7 and the slot X+8 is configured with the DM-RS pattern of the first slot in the basic pattern group because of limited number of slots.

Figure 18A:
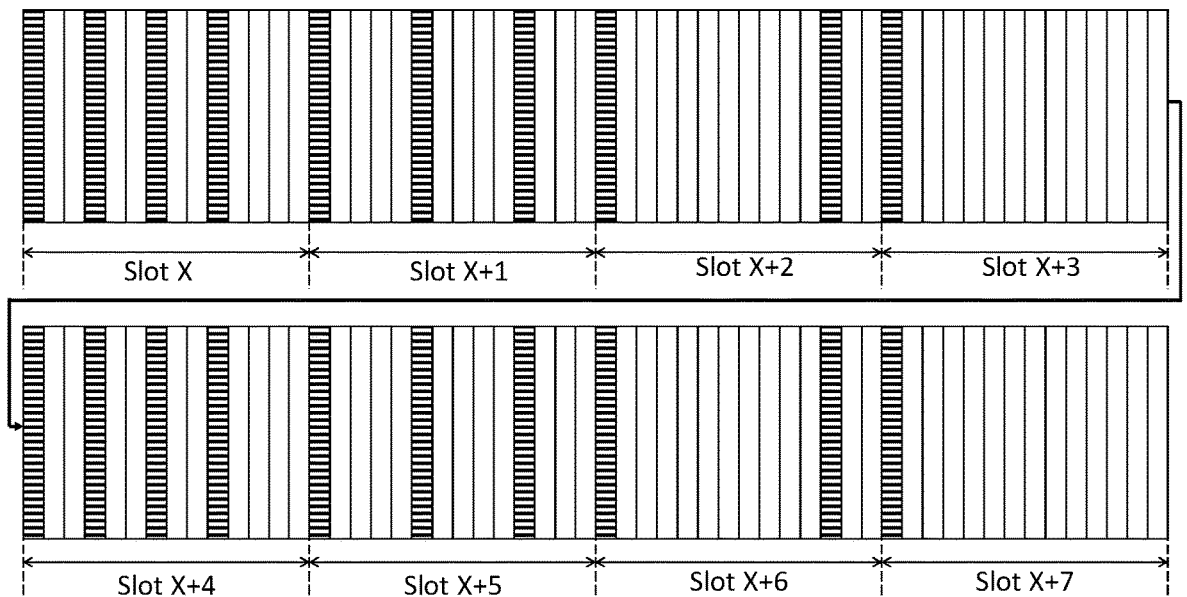
FIGS. 18A and 18B show a schematic diagram of a reference signal across slots according to an embodiment of the present disclosure.
Figure 18B:
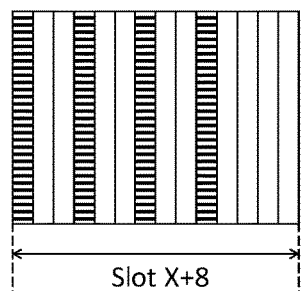

FIGS. 18A and 18B show a schematic diagram of the DM-RS across slots according to an embodiment of the present disclosure. In FIGS. 18A and 18B, a repetition unit comprises 9 slots X to X+8 and the basic pattern group is similar to the reference signal shown in FIG. 16. In such condition, the basic pattern group is repeated in slots X to X+7 and the slot X+8 is configured with the DM-RS pattern of the first slot in the basic pattern group because of limited number of slots.

Embodiment 3

Figure 19:
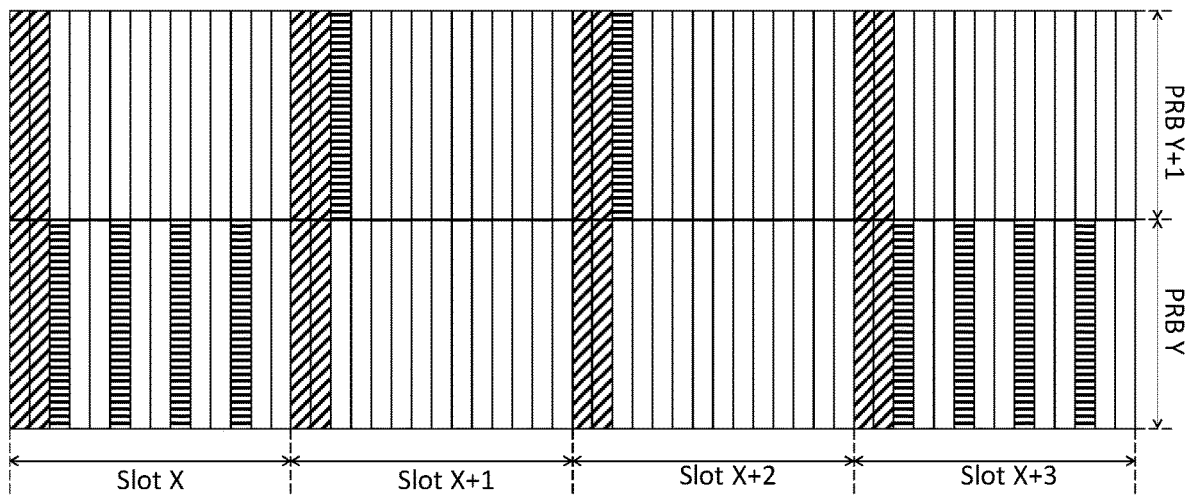
FIG. 19 shows a schematic diagram of a reference signal across slots and physical resource blocks according to an embodiment of the present disclosure.

In an embodiment, the RS overhead reduction may be implemented in both time and frequency domains. For example, the RS overhead reduction may be achieved by frequency hopping. FIG. 19 shows a schematic diagram of the reference signal across slots and PRBs according to an embodiment of the present disclosure. In FIG. 19, each block refers to a symbol, the first 2 blocks of each slot are allocated for PDCCH and blocks with horizontal line texture carry the DM-RS. In this embodiment, the RS overhead reduction is implemented in frequency domain per slot. More specifically, the DM-RS in one of PRBs Y and Y+1 is selected to be enabled/disabled. Furthermore, the RS overhead reduction is implemented in time domain across slots. More specifically, two DM-RS patterns are used in FIG. 19, wherein the DM-RS pattern with high RS density is utilized in slots X and X+3 and another DM-RS pattern with low RS density is utilized in slots X+1 and X+2. In an embodiment, these two different DM-RS patterns may be individually configured. As an alternative or in addition, configurations of the DM-RS pattern with low RS density may be determined based on at least part of configurations of the DM-RS pattern with high RS density.

Figure 20:
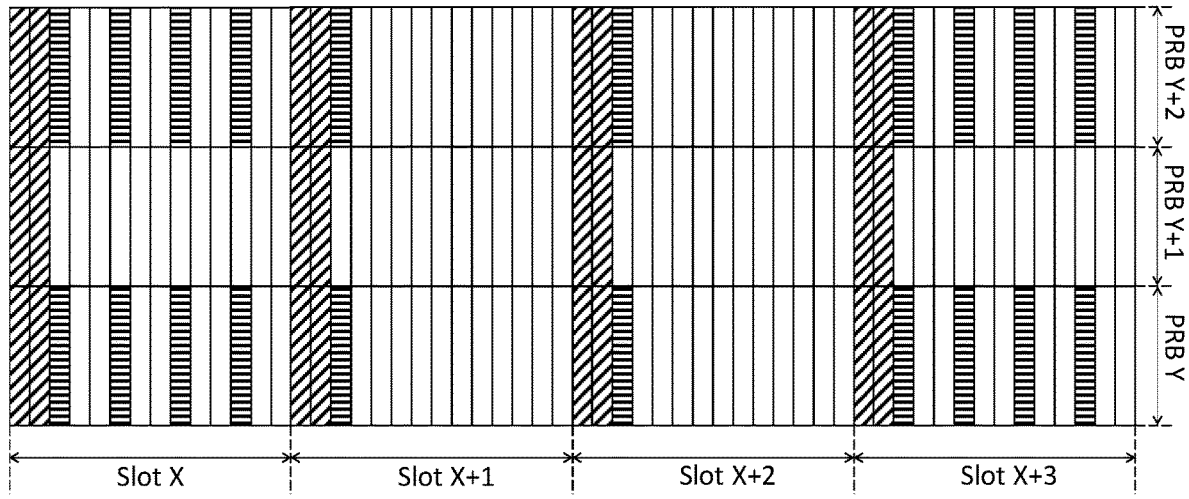
FIG. 20 shows a schematic diagram of a reference signal across slots and physical resource blocks according to an embodiment of the present disclosure.

In an embodiment, the RS overhead reduction is realized by disabling the RS in certain frequency resource (e.g. PRB). FIG. 20 shows a schematic diagram of the reference signal across slots and PRBs according to an embodiment of the present disclosure. Similar to the reference signal shown in FIG. 19, the DM-RS pattern with high RS density is utilized in slots X and X+3 and another DM-RS pattern with low RS density is utilized in slots X+1 and X+2 in FIG. 20. Note that the DM-RS in the PRB Y+1 is disabled for all slots X to X+3.

Embodiment 4

In an embodiment, relative changes may be made correspondingly when considering the aforementioned embodiments of RS overhead reduction.

In an embodiment, transport block size (TBS) of data with which the RS is aligned (i.e. the data which is transmitted with the RS) may be changed when the RS overhead is reduced. For example, in an embodiment with I scheduling units comprising J REs carrying the RS, the TBS of the data carried on the I scheduling units is determined based on the number of the REs carrying the RS (i.e. J), wherein I and J are integers greater than 1.

More specifically, for determining the TBS of the data, the RS overhead (e.g. DM-RS overhead) is considered for the REs (e.g. REs carrying the RS) allocated for PUSCH, PDSCH, PDCCH and/or PBCH (physical broadcast channel) number calculation. In an embodiment of the RS overhead reduction being enabled, the general RS overhead may be different per scheduling unit (e.g. per PRB, per slot, per repetition unit or per aggregation unit). In such condition, the number of REs utilized for determining the TBS may be determined as one of the following:

A) The number of REs is determined based on the number of REs carrying the DM-RS in the DM-RS pattern with the largest DM-RS density.

B) The number of REs is determined based on the number of REs carrying the DM-RS in the DM-RS pattern with average DM-RS density across slots.

C) The number of REs is determined based on the number of REs carrying the DM-RS in the DM-RS pattern with the greatest additional DM-RS configuration.

D) The number of REs is determined based on the number of REs carrying the DM-RS in the DM-RS pattern in the DM-RS pattern with the lowest DM-RS density.

In an embodiment of the aggregated transmission or repetition, the TBS of each repetition unit may be determined individually.

In an embodiment of multiple slots are aggregated for transmission, the TBS is determined based on the bundling of all slots. For example, the TBS is determined over all K slots which are bundled together, wherein K is an integer and may be equal to the length of a basic RS pattern group.

In an embodiment, modulation and coding scheme (MCS) indication may correspondingly change with the RS overhead reduction. For example, the MCS indication may change when considering repetition or aggregation.

In an embodiment of the TBS being determined based on the bundling of slots, single MCS indication is signaled to the UE.

In an embodiment of the same TBS is determined for scheduling units of repetition or aggregation, multiple MCS indications may be utilized.

FIG. 21 shows a flowchart of a process according to an embodiment of the present disclosure. The process shown in FIG. 21 may be utilized in a transmitting node (e.g. UE or BS) and comprises the following step:

Step 2100: Transmit, to a receiving node, the reference signal comprising N patterns allocated to scheduling unit(s).

In this embodiment, N is an integer greater than 1.

In FIG. 21, the transmitting node transmits the reference signal comprising N (N≥1) patterns to the receiving node (e.g. BS or UE), wherein the N patterns are allocated to scheduling unit(s). In an embodiment, a pattern refers to the structure of resource in at least one of time domain or frequency domain for carrying the RS. In an embodiment, the pattern is defined within the basic resource unit(s), such as PRB(s) and/or slot(s).

In an embodiment, the scheduling unit(s) may refer to a resource allocated for the reference signal. In an embodiment, the scheduling unit(s) may refer to a resource allocated for other channels (e.g. PUSCH or PDSCH) with which the reference signal is aligned.

In an embodiment, the scheduling unit(s) refer to a resource comprising at least one of a set of resource blocks, a set of symbols, a repetition unit, a set of slots, a frame, or a slot.

In an embodiment, the scheduling unit(s) refer to a resource allocated via at least one scheduling signaling. For example, the at least one scheduling signaling comprises downlink control information (DCI), a radio resource control (RRC) configuration (e.g. for configuring grant) or a random access response.

In an embodiment, the allocation of the scheduling unit(s) to transmission(s) may be:

1) Resource allocation in either time or frequency domain via DCI indication and/or RRC configuration;

2) Resource allocation in time domain via the configuration of repetition, aggregation for transmission;

3) Resource allocation in frequency domain via configuration of simultaneously transmission of different carriers.

In an embodiment, the reference signal refers to at least one of a DM-RS, a CSI-RS, a phase tracking reference signal, a positioning reference signal, or a sounding reference signal.

In an embodiment, the N patterns are different from each other. Note that the difference between two patterns refers to that the patterns of RS are different. That is, the required or occupied resource (e.g., RE(s)) of the RS in at least one of time domain or frequency domain within corresponding scheduling unit(s) are different.

In an embodiment, at least one parameter of at least one of a reference signal type, a front-loaded reference signal configuration, an additional reference signal configuration, a time domain location of the reference signal or a frequency location of the reference signal are configured for each of the N patterns. In this embodiment, the parameter of configuring the N patterns are explicitly configured. In an embodiment, the time domain location and/or the frequency domain location of the reference signal may be explicitly configured for radio access technologies (RATs) other than new radio. For example, in narrowband IoT (NB-IoT), the DM-RS of NPUSCH (i.e. the PUSCH in the NB-IoT) is predefined and coupled with the format of NPUSCH (e.g. part of scheduling information of data).

In an embodiment, at least one parameter of at least one of a reference signal type, a front-loaded reference signal configuration, an additional reference signal configuration, a time domain location of the reference signal or a frequency location of the reference signal for a first pattern of the N patterns is determined by at least one of corresponding parameters of a second pattern of the N patterns, index of resource comprising the reference signal associated with the first pattern and the second pattern, or scheduling information of data corresponding to the reference signal associated with the first pattern and the second pattern. In other words, the parameters of configuring one of the N patterns (e.g. the first pattern) may not be explicitly configured and may be determined based information associated with itself and/or other patterns (e.g. the second pattern). Taking the DM-RS shown in FIG. 18A as an example, the parameters associated with additional reference signal configuration of pattern in each basic pattern group may be determined based on the indexes of the slots comprising the patterns comprised in the basic pattern group.

In an embodiment, the scheduling information comprises an RV, a new data indicator (NDI), a modulation and coding scheme (MCS), a transmission configuration indication (TCI) indication and a quasi co-location (QCL) relationship, a resource allocation type (e.g. different resource allocation types in time domain for new radio) or a channel format (different channel types for NB-IoT).

In an embodiment, a third pattern of the N patterns is determined by disabling the entire reference signal in a fourth pattern. In other words, the transmission of RS may be disabled in certain scheduling unit(s) (e.g. the scheduling unit(s) corresponding to the third pattern) (see, e.g., FIGS. 10 and 11).

In an embodiment, a fifth pattern of the N patterns comprises a part (e.g. a fraction or a subset) of the reference signal in a sixth pattern of the N patterns. In this embodiment, one of the N patterns (i.e. the fifth pattern) may be determined (e.g. acquired) by disabling/selecting a part (e.g. a fraction or a subset) of the reference signal in another pattern (i.e. the sixth pattern). That is, not entire RS in the sixth pattern is transmitted or not all of resource (e.g. REs) occupied by the RS in the sixth pattern is used for the RS transmission of the fifth pattern.

In an embodiment, the disabled or selected fraction of the reference signal in the sixth pattern is determined based on a factor (e.g. down sampling factor), wherein the factor may be configured via signaling or predefined as a fixed value. As an alternative or in addition, the factor may be the fixed value before being configured.

In an embodiment, the disabled or selected fraction of the reference signal in the sixth pattern is located at upper or lower half of the second pattern (e.g. the DM-RS pattern shown in FIG. 7).

In an embodiment, each of the at least one scheduling unit is corresponding to one of the N patterns based on a bit map.

In an embodiment, each of the at least one scheduling unit is corresponding to one of the N patterns based on a predetermined rule. For example, the scheduling unit with an odd index may be corresponding to the same pattern and/or the scheduling unit with an even index may be corresponding to the same pattern.

In an embodiment, the scheduling units carrying the data with the same scheduling information are corresponding to the same pattern.

In an embodiment, the scheduling units carrying the data with scheduling information which belongs to the same group is corresponding to the same pattern (e.g. the DM-RS patterns shown in FIGS. 12 and 13).

In an embodiment, the at least one scheduling unit comprises a basic pattern group which is across L scheduling units and comprises the N patterns, wherein L is an integer greater than or equal to N (i.e. L≥N).

In an embodiment, the basic pattern group is repeated on M scheduling units, wherein M is an integer greater than L.

In an embodiment, the $1^{st}$ (the first one) scheduling unit of the basic pattern group carries the reference signal. That is, the $1^{st}$ scheduling unit is corresponding to the pattern with RS transmission(s).

In an embodiment, the $1^{st}$ (the first one) scheduling unit of the at least one scheduling unit carries the reference signal.

In an embodiment, the transmitting node may receive an indication of enabling the reference signal with the N patterns (e.g. enabling the RS overhead reduction) from the receiving node.

In an embodiment, the transmitting node may receive a configuration associated with the reference signal from the receiving node, wherein the configuration comprises at least one of a factor, a bit map, the number of scheduling units in single repetition unit, a front-loaded reference signal configuration for the N patterns or an additional reference signal configuration for the N pattern.

In an embodiment, the transmitting node receives scheduling information of data associated with the reference signal, from the receiving node, wherein the scheduling information comprises at least one of an RV, an NDI, an MCS, a TCI indication, a QCL relationship, resource allocation type or a channel format.

In an embodiment of the transmitting node being the UE and the receiving node being the BS, the transmitting node receives, from the receiving node, at least one of the indication enabling the reference signal with the N patterns, the configuration associated with the reference signal or the scheduling information of data associated with the reference signal.

In an embodiment of the transmitting node being the BS and the and the receiving node being the UE, the transmitting node may change to transmit, to the receiving node, at least one of the indication enabling the reference signal with the N patterns, the configuration associated with the reference signal or the scheduling information of data associated with the reference signal.

In an embodiment, a TBS of data which is transmitted along with the reference signal is determined based on the number of resource elements associated with the N patterns.

In an embodiment, the number of resource elements associated with the N patterns is determined based on the number of resource elements carrying the reference signal in the pattern with the highest reference signal density among the N patterns.

In an embodiment, the number of resource elements associated with the N patterns is determined based on an average of the number of resource elements carrying the reference signal in each of N patterns.

In an embodiment, the number of resource elements associated with the N patterns is determined based on the number of resource elements carrying the reference signal in the pattern having the highest reference signal density among the N patterns and a ratio.

In an embodiment, the number of resource elements associated with the N patterns is determined based on the number of resource elements carrying the reference signal in the pattern having the lowest reference signal density among the N patterns.

In an embodiment, the N patterns form at least one basic pattern group across L scheduling units, wherein L is an integer greater than or equal to N. In addition, the basic pattern group is repeated on M scheduling units, wherein M is an integer greater than L. In this embodiment, the TBS is determined per basic pattern group or for all of M scheduling units.

In an embodiment of the TBS being determined for all of M scheduling units, a modulation and coding scheme is configured for the M scheduling units.

In an embodiment of the TBS being determined per basic pattern group, a modulation and coding schemes is configured per basic pattern group.

FIG. 22 shows a flowchart of a process according to an embodiment of the present disclosure. The process shown in FIG. 22 may be utilized in a receiving node (e.g. BS or UE) and comprises the following step:

Step 2200: receive, from the transmitting node, the reference signal comprising N patterns allocated to scheduling unit(s), wherein N is an integer greater than 1.

In FIG. 22, the receiving node receives the reference signal comprising N (N≥1) patterns from the transmitting node (e.g. UE or BS), wherein the N patterns are allocated to scheduling unit(s). In an embodiment, a pattern refers to the structure of resource in at least one of time domain or frequency domain for carrying the RS. In an embodiment, the pattern is defined within the basic resource unit(s), such as PRB(s) and/or slot(s).

In an embodiment, the scheduling unit(s) may refer to a resource allocated for the reference signal. In an embodiment, the scheduling unit(s) may refer to a resource allocated for other channels (e.g. PUSCH or PDSCH) with which the reference signal is aligned.

In an embodiment, the scheduling unit(s) refer to a resource comprising at least one of a set of resource blocks, a set of symbols, a repetition unit, a set of slots, a frame, or a slot.

In an embodiment, the scheduling unit(s) refer to a resource allocated via at least one scheduling signaling. For example, the at least one scheduling signaling comprises DCI, an RRC configuration (e.g. for configuring grant) or a random access response.

In an embodiment, the allocation of the scheduling unit(s) to transmission(s) may be:
1) Resource allocation in either time or frequency domain via DCI indication and/or RRC configuration;
2) Resource allocation in time domain via the configuration of repetition, aggregation for transmission;
3) Resource allocation in frequency domain via configuration of simultaneously transmission of different carriers.

In an embodiment, the reference signal refers to at least one of a DM-RS, a CSI-RS, a phase tracking reference signal, a positioning reference signal, or a sounding reference signal.

In an embodiment, the N patterns are different from each other. Note that the difference between two patterns refers to that the patterns of RS are different. That is, the required or occupied resource (e.g., RE(s)) of the RS in at least one of time domain or frequency domain within corresponding scheduling unit(s) are different.

In an embodiment, at least one parameter of at least one of a reference signal type, a front-loaded reference signal configuration, an additional reference signal configuration, a time domain location of the reference signal or a frequency location of the reference signal are configured for each of the N patterns. In this embodiment, the parameter of configuring the N patterns are explicitly configured. In an embodiment, the time domain location and/or the frequency domain location of the reference signal may be explicitly configured for radio access technologies (RATs) other than new radio. For example, in narrowband IoT (NB-IoT), the DM-RS of NPUSCH (i.e. the PUSCH in the NB-IoT) is predefined and coupled with the format of NPUSCH (e.g. part of scheduling information of data).

In an embodiment, at least one parameter of at least one of a reference signal type, a front-loaded reference signal configuration, an additional reference signal configuration, a time domain location of the reference signal or a frequency location of the reference signal for a first pattern of the N patterns is determined by at least one of corresponding parameters of a second pattern of the N patterns, index of resource comprising the reference signal associated with the first pattern and the second pattern, or scheduling information of data corresponding to the reference signal associated with the first pattern and the second pattern. In other words, the parameters of configuring one of the N patterns (i.e. the first pattern) may not be explicitly configured and may be determined based information associated with itself and/or another pattern (i.e. the second pattern).

In an embodiment, the scheduling information comprises an RV, an NDI, an MCS, a TCI indication and a QCL relationship, a resource allocation type (e.g. different resource allocation types in time domain for new radio) or a channel format (different channel types for NB-IoT).

In an embodiment, a third pattern of the N patterns is determined by disabling the entire reference signal in a fourth pattern. In other words, the transmission of RS may be disabled in certain scheduling unit(s) (e.g. the scheduling unit(s) corresponding to the third pattern) (see, e.g., FIGS. 10 and 11).

In an embodiment, a fifth pattern of the N patterns comprises a part (e.g. a fraction or a subset) of the reference signal in a sixth pattern of the N patterns. In this embodiment, one of the N patterns (i.e. the fifth pattern) may be determined (e.g. acquired) by disabling/selecting a part (e.g. a fraction or a subset) of the reference signal in another pattern (i.e. the sixth pattern). That is, not all of RS in the sixth pattern is transmitted or not all of resource (e.g. REs) occupied by the RS in the sixth pattern is used for the RS transmission of the fifth pattern.

In an embodiment, the disabled or selected fraction of the reference signal in the sixth pattern is determined based on a factor (e.g. down sampling factor), wherein the factor may be configured via signaling or predefined as a fixed value. As an alternative or in addition, the factor may be the fixed value before being configured.

In an embodiment, the disabled or selected fraction of the reference signal in the sixth pattern is located at upper or lower half of the second pattern (e.g. the DM-RS pattern shown in FIG. 7).

In an embodiment, each of the at least one scheduling unit is corresponding to one of the N patterns based on a bit map.

In an embodiment, each of the at least one scheduling unit is corresponding to one of the N patterns based on a predetermined rule. For example, the scheduling unit with an odd index may be corresponding to the same pattern and/or the scheduling unit with an even index may be corresponding to the same pattern.

In an embodiment, the scheduling units carrying the data with the same scheduling information are corresponding to the same pattern.

In an embodiment, the scheduling units carrying the data with scheduling information which belongs to the same group is corresponding to the same pattern (e.g. the DM-RS patterns shown in FIGS. 12 and 13).

In an embodiment, the at least one scheduling unit comprises a basic pattern group which is across L scheduling units and comprises the N patterns, wherein L is an integer greater than or equal to N (i.e. L≥N).

In an embodiment, the basic pattern group is repeated on M scheduling units, wherein M is an integer greater than L.

In an embodiment, the 1$^{st}$ (the first one) scheduling unit of the basic pattern group carries the reference signal. That is, the 1$^{st}$ scheduling unit is corresponding to the pattern with RS transmission(s).

In an embodiment, the 1$^{st}$ (the first one) scheduling unit of the at least one scheduling unit carries the reference signal.

In an embodiment, the receiving node may transmit an indication of enabling the reference signal with the N patterns (e.g. enabling the RS overhead reduction) from the receiving node.

In an embodiment, the receiving node may transmit a configuration associated with the reference signal from the receiving node, wherein the configuration comprises at least one of a factor, a bit map, the number of scheduling units in single repetition unit, a front-loaded reference signal configuration for the N patterns or an additional reference signal configuration for the N pattern.

In an embodiment, the receiving node may transmit scheduling information of data associated with the reference signal, from the receiving node, wherein the scheduling information comprises at least one of an RV, an NDI, a MCS, a TCI indication, a QCL relationship, a resource allocation type or a channel format.

In an embodiment of the transmitting node being the UE and the receiving node being the BS, the receiving node transmits, to the transmitting node, at least one of the indication enabling the reference signal with the N patterns, the configuration associated with the reference signal or the scheduling information of data associated with the reference signal.

In an embodiment of the transmitting node being the BS and the and the receiving node being the UE, the receiving node may change to receive, from the transmitting node, at least one of the indication enabling the reference signal with the N patterns, the configuration associated with the reference signal or the scheduling information of data associated with the reference signal.

In an embodiment, a TBS of data which is transmitted along with the reference signal is determined based on the number of resource elements associated with the N patterns.

In an embodiment, the number of resource elements associated with the N patterns is determined based on the number of resource elements carrying the reference signal in the pattern with the highest reference signal density among the N patterns.

In an embodiment, the number of resource elements associated with the N patterns is determined based on an average of the number of resource elements carrying the reference signal in each of N patterns.

In an embodiment, the number of resource elements associated with the N patterns is determined based on the number of resource elements carrying the reference signal in the pattern having the highest reference signal density among the N patterns and a ratio.

In an embodiment, the number of resource elements associated with the N patterns is determined based on the number of resource elements carrying the reference signal in the pattern having the lowest reference signal density among the N patterns.

In an embodiment, the N patterns form at least one basic pattern group across L scheduling units, wherein L is an integer greater than or equal to N. In addition, the basic pattern group is repeated on M scheduling units, wherein M is an integer greater than L. In this embodiment, the TBS is determined per basic pattern group or for all of M scheduling units.

In an embodiment of the TBS being determined for all of M scheduling units, a modulation and coding scheme is configured for the M scheduling units.

In an embodiment of the TBS being determined per basic pattern group, a modulation and coding schemes is configured per basic pattern group.

FIG. 23 shows a flowchart of a process according to an embodiment of the present disclosure. The process shown in FIG. 23 may be utilized in a transmitting node (e.g. UE or BS) and comprises the following step:

Step 2300: Transmit, to a receiving node, data along with the reference signal comprising N patterns allocated to scheduling unit(s), wherein a transport block size of the data is determined based on the number of resource elements associated with the N patterns.

In this embodiment, N is an integer greater than 1.

In FIG. 23, the transmitting node transmits data along with the RS comprising N (N≥1) patterns to the receiving node (e.g. BS or UE), wherein the N patterns are allocated to scheduling unit(s). In an embodiment, a pattern refers to the structure of resource in at least one of time domain or frequency domain for carrying the RS. In an embodiment, the pattern is defined within the basic resource unit(s), such as PRB(s) and/or slot(s). In this embodiment, the TBS of the data is determined based on the number of resource elements associated with the N patterns.

In an embodiment, the number of resource elements associated with the N patterns is determined based on the number of resource elements carrying the RS in the pattern with the highest reference signal density among the N patterns.

In an embodiment, the number of resource elements associated with the N patterns is determined based on an average of the number of resource elements carrying the RS in each of N patterns.

In an embodiment, the number of resource elements associated with the N patterns is determined based on the number of resource elements carrying the RS in the pattern having the highest reference signal density among the N patterns and a ratio.

In an embodiment, the number of resource elements associated with the N patterns is determined based on the number of resource elements carrying the RS in the pattern having the lowest reference signal density among the N patterns.

In an embodiment, the N patterns form at least one basic pattern group across L scheduling units, wherein L is an integer greater than or equal to N. In addition, the basic pattern group is repeated on M scheduling units, wherein M is an integer greater than L. In this embodiment, the TBS is determined per basic pattern group or for all of M scheduling units.

In an embodiment of the TBS being determined for all of M scheduling units, a modulation and coding scheme is configured for the M scheduling units.

In an embodiment of the TBS being determined per basic pattern group, a modulation and coding schemes is configured per basic pattern group.

In an embodiment, the scheduling unit(s) refers to a resource comprising at least one of a set of resource blocks, a set of symbols, a set of slots, a set of repetition units, a repetition unit, a frame, or a slot.

In an embodiment, the RS refers to at least one of a DM-RS, a CSI-RS, a phase tracking reference signal, a positioning reference signal, or a sounding reference signal.

FIG. 24 shows a flowchart of a process according to an embodiment of the present disclosure. The process shown in FIG. 24 may be utilized in a receiving node (e.g. BS or UE) and comprises the following step:

Step 2400: Receive, from a transmitting node, data along with the reference signal comprising N patterns allocated to scheduling unit(s), wherein a transport block size of the data is determined based on the number of resource elements associated with the N patterns.

In this embodiment, N is an integer greater than 1.

In FIG. 24, the receiving node receives data along with the RS comprising N (N≥1) patterns from the transmitting node (e.g. UE or BS), wherein the N patterns are allocated to scheduling unit(s). In an embodiment, a pattern refers to the structure of resource in at least one of time domain or frequency domain for carrying the RS. In an embodiment, the pattern is defined within the basic resource unit(s), such as PRB(s) and/or slot(s). In this embodiment, the TBS of the data is determined based on the number of resource elements associated with the N patterns.

In an embodiment, the number of resource elements associated with the N patterns is determined based on the number of resource elements carrying the RS in the pattern with the highest reference signal density among the N patterns.

In an embodiment, the number of resource elements associated with the N patterns is determined based on an average of the number of resource elements carrying the RS in each of N patterns.

In an embodiment, the number of resource elements associated with the N patterns is determined based on the number of resource elements carrying the RS in the pattern having the highest reference signal density among the N patterns and a ratio.

In an embodiment, the number of resource elements associated with the N patterns is determined based on the number of resource elements carrying the RS in the pattern having the lowest reference signal density among the N patterns.

In an embodiment, the N patterns form at least one basic pattern group across L scheduling units, wherein L is an integer greater than or equal to N. In addition, the basic pattern group is repeated on M scheduling units, wherein M is an integer greater than L. In this embodiment, the TBS is determined per basic pattern group or for all of M scheduling units.

In an embodiment of the TBS being determined for all of M scheduling units, a modulation and coding scheme is configured for the M scheduling units.

In an embodiment of the TBS being determined per basic pattern group, a modulation and coding schemes is configured per basic pattern group.

In an embodiment, the scheduling unit(s) refers to a resource comprising at least one of a set of resource blocks, a set of symbols, a set of slots, a set of repetition units, a repetition unit, a frame, or a slot.

In an embodiment, the RS refers to at least one of a DM-RS, a CSI-RS, a phase tracking reference signal, a positioning reference signal, or a sounding reference signal.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method for use in a transmitting node, the wireless communication method comprising:
   transmitting, to a receiving node, a reference signal comprising N patterns allocated to at least one scheduling unit,
   wherein N is an integer greater than 1,
   wherein one of the N patterns is:
      a third pattern of the N patterns that is determined by disabling the entire reference signal in a fourth pattern,
      a fifth pattern of the N patterns that comprises a part of the reference signal in a sixth pattern of the N patterns,
   wherein the reference signal in the fifth pattern is determined by disabling or selecting a fraction of the reference signal in the sixth pattern,
   wherein the disabled or selected fraction of the reference signal in the sixth pattern is determined based on a factor,
   wherein the disabled or selected fraction of the reference signal in the sixth pattern is located at an upper or lower half of a second pattern, and
   wherein each of the at least one scheduling unit is corresponding to one of the N patterns based on a bit map.

2. The wireless communication method of claim 1, wherein the at least one scheduling unit refers to a resource comprising at least one of a set of resource blocks, a set of symbols, a set of slots, a set of repetition units, a repetition unit, a frame, or a slot,
   wherein the at least one scheduling unit refers to a resource allocated via at least one scheduling signaling,
   wherein the reference signal refers to at least one of a demodulation reference signal, a channel state information reference signal, a phase tracking reference signal, a positioning reference signal, or a sounding reference signal, wherein the N patterns are different from each other,
wherein at least one parameter of at least one of a reference signal type, a front-loaded reference signal configuration, an additional reference signal configuration, a time domain location of the reference signal or a frequency location of the reference signal are configured for each of the N patterns, and
wherein at least one parameter of at least one of a reference signal type, a front-loaded reference signal configuration, an additional reference signal configuration, a time domain location of the reference signal or a frequency location of the reference signal for a first pattern of the N patterns is determined by at least one of:
corresponding parameters of a second pattern of the N patterns,
index of resource comprising the reference signal associated with the first pattern and the second pattern, or
scheduling information of data corresponding to the reference signal associated with the first pattern and the second pattern.

3. The wireless communication method of claim 1, wherein each of the at least one scheduling unit is corresponding to one of the N patterns based on a predetermined rule,
wherein scheduling units with an odd index are corresponding to the same pattern or scheduling units with an even index are corresponding to the same pattern,
wherein the scheduling units carrying the data with the same scheduling information are corresponding to the same pattern,
wherein the scheduling units carrying the data with scheduling information which belongs to the same group are corresponding to the same pattern,
wherein the at least one scheduling unit comprises a basic pattern group which is across L scheduling units and comprises the N patterns, wherein L is an integer greater than or equal to N,
wherein the basic pattern group is repeated on M scheduling units, wherein M is an integer greater than L, and
wherein the first scheduling unit of the basic pattern group carries the reference signal.

4. The wireless communication method of claim 1, wherein a first scheduling unit of the at least one scheduling unit carries the reference signal,
wherein an indication of enabling the reference signal is received from or transmitted to the receiving node by the transmitting node,
wherein a configuration associated with the reference signal is received from or transmitted to the receiving node by the transmitting node, wherein the configuration comprises at least one of a factor, a bit map, the number of scheduling units in single repetition unit, a front-loaded reference signal configuration for the N patterns, an additional reference signal configuration for the N pattern, a time domain location of the reference signal or a frequency location of the reference signal,
wherein scheduling information of data associated with the reference signal is received from or transmitted to the receiving node by the transmitting node, wherein the scheduling information comprises at least one of a redundancy version, a new data indicator, a modulation and coding scheme, a transmission configuration indication, a quasi co-location relationship, a resource allocation type or a channel format.

5. A wireless communication method for use in a receiving node, the wireless communication method comprising:
receiving, from a transmitting node, a reference signal comprising N patterns allocated to at least one scheduling unit,
wherein N is an integer greater than 1,
wherein one of the N patterns is:
a third pattern of the N patterns that is determined by disabling the entire reference signal in a fourth pattern,
a fifth pattern of the N patterns that comprises a part of the reference signal in a sixth pattern of the N patterns,
wherein the reference signal in the fifth pattern is determined by disabling or selecting a fraction of the reference signal in the sixth pattern,
wherein the disabled or selected fraction of the reference signal in the sixth pattern is determined based on a factor,
wherein the disabled or selected fraction of the reference signal in the sixth pattern is located at an upper or lower half of a second pattern, and
wherein each of the at least one scheduling unit is corresponding to one of the N patterns based on a bit map.

6. The wireless communication method of claim 5, wherein the at least one scheduling unit refers to a resource comprising at least one of a set of resource blocks, a set of symbols, a set of slots, a set of repetition unit, a repetition unit, a frame, or a slot,
wherein the at least one scheduling unit refers to a resource allocated via at least one scheduling signaling,
wherein the reference signal refers to at least one of a demodulation reference signal, a channel state information reference signal, a phase tracking reference signal, a positioning reference signal, or a sounding reference signal,
wherein the N patterns are different from each other,
wherein at least one parameter of at least one of a reference signal type, a front-loaded reference signal configuration, an additional reference signal configuration, a time domain location of the reference signal or a frequency location of the reference signal are configured for each of the N patterns, and
wherein at least one parameter of at least one of a reference signal type, a front-loaded reference signal configuration, an additional reference signal configuration, a time domain location of the reference signal or a frequency location of the reference signal for a first pattern of the N patterns is determined by at least one of:
corresponding parameters of a second pattern of the N patterns,
index of resource comprising the reference signal associated with the first pattern and the second pattern, or
scheduling information of data corresponding to the reference signal associated with the first pattern and the second pattern.

7. The wireless communication method of claim 5, wherein each of the at least one scheduling unit is corresponding to one of the N patterns based on a predetermined rule,
wherein scheduling units with an odd index are corresponding to the same pattern or scheduling units with an even index are corresponding to the same pattern, wherein the scheduling units carrying the data with the same scheduling information are corresponding to the same pattern, wherein the scheduling units carrying the data with scheduling information which belongs to the same group are corresponding to the same pattern, wherein the at least one scheduling unit comprises a basic pattern group which is across L scheduling units and comprises the N patterns, wherein L is an integer greater than or equal to N, wherein the basic pattern group is repeated on M scheduling units, wherein M is an integer greater than L, and wherein the first scheduling unit of the basic pattern group carries the reference signal.

8. The wireless communication method of claim 5, wherein a first scheduling unit of the at least one scheduling unit carries the reference signal, wherein an indication of enabling the reference signal is received from or transmitted to the transmitting node by the receiving node, wherein a configuration associated with the reference signal is received from or transmitted to the transmitting node by the receiving node, wherein the configuration comprises at least one of a factor, a bit map, the number of scheduling units in single repetition unit, a front-loaded reference signal configuration for the N patterns, an additional reference signal configuration for the N pattern, a time domain location of the reference signal or a frequency location of the reference signal, wherein scheduling information of data associated with the reference signal is received from or transmitted to the transmitting node by the receiving node, wherein the scheduling information comprises at least one of a redundancy version, a new data indicator, a modulation and coding scheme, a transmission configuration indication, a quasi co-location relationship, a resource allocation type or a channel format.

9. A transmitting node, comprising at least one processor, wherein the at least one processor is configured to transmit, to a receiving node, a reference signal comprising N patterns allocated to at least one scheduling unit, wherein N is an integer greater than 1, wherein one of the N patterns is:

a third pattern of the N patterns that is determined by disabling the entire reference signal in a fourth pattern, a fifth pattern of the N patterns that comprises a part of the reference signal in a sixth pattern of the N patterns, wherein the reference signal in the fifth pattern is determined by disabling or selecting a fraction of the reference signal in the sixth pattern, wherein the disabled or selected fraction of the reference signal in the sixth pattern is determined based on a factor, wherein the disabled or selected fraction of the reference signal in the sixth pattern is located at an upper or lower half of a second pattern, and wherein each of the at least one scheduling unit is corresponding to one of the N patterns based on a bit map.

10. The transmitting node of claim 9, wherein the at least one scheduling unit refers to a resource comprising at least one of a set of resource blocks, a set of symbols, a set of slots, a set of repetition units, a repetition unit, a frame, or a slot, wherein the at least one scheduling unit refers to a resource allocated via at least one scheduling signaling, wherein the reference signal refers to at least one of a demodulation reference signal, a channel state information reference signal, a phase tracking reference signal, a positioning reference signal, or a sounding reference signal, wherein the N patterns are different from each other, wherein at least one parameter of at least one of a reference signal type, a front-loaded reference signal configuration, an additional reference signal configuration, a time domain location of the reference signal or a frequency location of the reference signal are configured for each of the N patterns, and wherein at least one parameter of at least one of a reference signal type, a front-loaded reference signal configuration, an additional reference signal configuration, a time domain location of the reference signal or a frequency location of the reference signal for a first pattern of the N patterns is determined by at least one of:

corresponding parameters of a second pattern of the N patterns, index of resource comprising the reference signal associated with the first pattern and the second pattern, or scheduling information of data corresponding to the reference signal associated with the first pattern and the second pattern.

11. The transmitting node of claim 9, wherein each of the at least one scheduling unit is corresponding to one of the N patterns based on a predetermined rule, wherein scheduling units with an odd index are corresponding to the same pattern or scheduling units with an even index are corresponding to the same pattern, wherein the scheduling units carrying the data with the same scheduling information are corresponding to the same pattern, wherein the scheduling units carrying the data with scheduling information which belongs to the same group are corresponding to the same pattern, wherein the at least one scheduling unit comprises a basic pattern group which is across L scheduling units and comprises the N patterns, wherein L is an integer greater than or equal to N, wherein the basic pattern group is repeated on M scheduling units, wherein M is an integer greater than L, and wherein the first scheduling unit of the basic pattern group carries the reference signal.

12. The transmitting node of claim 9, wherein a first scheduling unit of the at least one scheduling unit carries the reference signal, wherein an indication of enabling the reference signal is received from or transmitted to the receiving node by the transmitting node, wherein a configuration associated with the reference signal is received from or transmitted to the receiving node by the transmitting node, wherein the configuration comprises at least one of a factor, a bit map, the number of scheduling units in single repetition unit, a front-loaded reference signal configuration for the N patterns, an additional reference signal configuration for the N pattern, a time domain location of the reference signal or a frequency location of the reference signal, wherein scheduling information of data associated with the reference signal is received from or transmitted to the receiving node by the transmitting node, wherein the scheduling information comprises at least one of a redundancy version, a new data indicator, a modulation and coding scheme, a transmission configuration indication, a quasi co-location relationship, a resource allocation type or a channel format.

* * * * *